(12) United States Patent
Abraham et al.

(10) Patent No.: US 11,356,364 B2
(45) Date of Patent: Jun. 7, 2022

(54) SMART ROUTING

(71) Applicant: Visa International Service Association, San Francisco, CA (US)

(72) Inventors: Biju Abraham, Fremont, CA (US); Rabeek RajaMydeen Kanavapeer, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/428,947

(22) PCT Filed: May 1, 2019

(86) PCT No.: PCT/US2019/030265
§ 371 (c)(1),
(2) Date: Aug. 5, 2021

(87) PCT Pub. No.: WO2020/222843
PCT Pub. Date: Nov. 5, 2020

(65) Prior Publication Data
US 2022/0086084 A1 Mar. 17, 2022

(51) Int. Cl.
*H04L 45/42* (2022.01)
*H04L 45/12* (2022.01)
(Continued)

(52) U.S. Cl.
CPC .......... *H04L 45/42* (2013.01); *H04L 43/0817* (2013.01); *H04L 43/0823* (2013.01);
(Continued)

(58) Field of Classification Search
CPC ......... H04L 45/00; H04L 45/22; H04L 45/24; H04L 45/28; H04L 45/42; H04L 45/44;
(Continued)

(56) References Cited

U.S. PATENT DOCUMENTS 5,592,672 A   1/1997   Grewal et al.
7,127,422 B1  10/2006  Bundy
(Continued)

FOREIGN PATENT DOCUMENTS

JP   2017/092665 A   5/2017
WO   2012/145701 A2  10/2012
(Continued)

OTHER PUBLICATIONS

International Search Report and Written Opinion dated Feb. 10, 2020 for International Application No. PCT/US2019/030265, 8 pages.

(Continued)

*Primary Examiner* — Peter Chen
(74) *Attorney, Agent, or Firm* — Kilpatrick Townsend & Stockton LLP

(57) ABSTRACT

Techniques are provided for intelligent routing to a node in a network, such as a transport computer. A gateway server may receive authorization requests from a resource provider computer. There may be multiple potential transport computers to which to potentially route the authorization requests, depending on relationships established between the parties. A routing decision may be made automatically based on real-time network measurements and/or static rules. Real-time network measurements may be obtained by monitoring transport computers for failures, delays, or other undesirable activity. The routing decisions may further be based on expected volumes (e.g., based on analysis of historical spikes in volume). The routing decisions may further be based on user-configured rules and preferences, received via a routing administration interface.

18 Claims, 13 Drawing Sheets

(51) Int. Cl.
| | |
|---|---|
| *H04L 43/0817* | (2022.01) |
| *H04L 43/10* | (2022.01) |
| *H04L 43/0823* | (2022.01) |
| *H04L 45/28* | (2022.01) |

(52) U.S. Cl.
CPC ............ *H04L 43/10* (2013.01); *H04L 45/123* (2013.01); *H04L 45/28* (2013.01)

(58) Field of Classification Search
CPC ..... H04L 45/70; H04L 45/123; H04L 45/124; H04L 45/125; H04L 43/10; H04L 43/08; H04L 43/0805; H04L 43/0817; H04L 43/0823
See application file for complete search history.

(56) References Cited

U.S. PATENT DOCUMENTS

| | | | |
|---|---|---|---|
| 7,725,351 | B1 | 5/2010 | Williams |
| 8,321,589 | B2 | 11/2012 | Ratica |
| 8,762,210 | B2 | 6/2014 | Balasubramanian |
| 10,498,897 | B1 * | 12/2019 | Chadha ............... H04M 3/5232 |
| 2007/0005774 | A1 | 1/2007 | Singh et al. |
| 2010/0106611 | A1 | 4/2010 | Paulsen et al. |
| 2012/0072347 | A1 * | 3/2012 | Conway ................. G06Q 20/40 705/44 |
| 2012/0221468 | A1 | 8/2012 | Kumnick et al. |
| 2014/0197950 | A1 | 7/2014 | Shupp et al. |
| 2014/0358789 | A1 | 12/2014 | Boding et al. |
| 2015/0081541 | A1 | 3/2015 | Hogg |
| 2015/0332145 | A1 | 11/2015 | Vasseur et al. |
| 2017/0163629 | A1 | 6/2017 | Law et al. |
| 2017/0364915 | A1 * | 12/2017 | Levy ...................... G06Q 30/06 |
| 2019/0026737 | A1 | 1/2019 | McLaughlin et al. |

FOREIGN PATENT DOCUMENTS

| | | |
|---|---|---|
| WO | 2016/084074 A1 | 6/2016 |
| WO | 2017/169471 A1 | 10/2017 |
| WO | 2019/018233 A1 | 1/2019 |

OTHER PUBLICATIONS

PCT/US2018/042104, "International Search Report and Written Opinion", dated Nov. 27, 2018, 11 pages.

International Preliminary Report on Patentability dated Jan. 30, 2020 for International Application No. PCT/US2018/042104, 8 pages.

Extended European Search Report for EP Application No. 18834728.0 dated Aug. 12, 2020.

Welcome to the Engagement Bureau, Press Release, "Visa and MasterCard Support Common Solutions to Enable U.S. Chip Debit Routing", http://newsroom.mastercard.com/press-releases/visa-and-mastercard-support-common-solutions-to-enable-u-s-chip-debit-routing/, downloaded Jul. 17, 2017, 3 pages.

Arctic Reservations, "Keep Business Running Smoothly with a Back Up Gateway Provider", Posted on Jun. 10, 2010, by m, https://www.arcticreservations.com/blog/2015/06/keep-business-running-smoothly-with-a-back-up-gateway-provider/, downloaded Jul. 17, 2017, 2 pages.

Non-Final Office Action received for U.S. Appl. No. 15/653,350 dated May 21, 2020, 18 pages.

Final Office Action received for U.S. Appl. No. 15/653,350 dated Jan. 4, 2021, 11 pages.

Non-Final Office Action received for U.S. Appl. No. 15/653,350 dated Mar. 31, 2021, 22 pages.

* cited by examiner

SMART RULES

SHOW/HIDE RULES

NAME: [ROUTING_RULE_1] — 902

RESOURCE PROVIDER : ID: [1234567] — 904

PRIMARY TRANSPORT COMPUTER: [TC1] — 906

SECONDARY TRANSPORT COMPUTER: [TC2] — 908

TERTIARY TRANSPORT COMPUTER: [TC3] — 910

ROUTING ENABLED: ☑

| NAME | FIELD ← 914 | VALUE ← 916 | PRIORITY ← 918 | TRANSPORT COMPUTER: ← 920 | CONDITION ← 922 |
|---|---|---|---|---|---|
| 1234567 | CURRENCY | USD | 1 | TC1 | EQUALS TO ⇔ |
| 1234567 | CURRENCY | CAD | 2 | TC1 | EQUALS TO ⇔ |
| 1234567 | CURRENCY | GBP | 3 | TC2 | EQUALS TO ⇔ |

[SUBMIT RULES] — 924

FIG. 9A

SMART ROUTING

CROSS-REFERENCES TO RELATED APPLICATIONS

This application is a 371 National Phase Application of International Patent Application No. PCT/US2019/030265, filed May 1, 2019, the entirety of which is incorporated herein by reference for all purposes.

BACKGROUND

In distributed networks, gateways perform an important function of routing messages to an appropriate destination. Computer networks enable disparate computers to cooperate in performing an action. For example, a first computer may make a request, which is sent to a gateway to route the request to a series of computers which process the request in cooperation. Each of these computers may perform a specific function. Increasingly, there may be multiple nodes in a network that can perform a particular function, creating routing options.

However, conventional routing is failure-prone. At a given time, a computer in a network may be in a failure state, or be overburdened with traffic, causing a delay. If a particular computer cannot be reached or is experiencing delays (e.g., due to infrastructure failure, system instability, maintenance, DDoS attack, etc.), then messages may not move through the network in a timely fashion.

Thus, there is a need for new systems and methods for automatically routing messages to an optimal destination, e.g., to one of several potential computers that can perform a given function.

BRIEF SUMMARY

Embodiments of the disclosure include methods and systems for intelligent routing of authorization requests to an appropriate transport computer using automatic rules and real-time network measurements. The transport computer may be selected from a set of transport computers which have a relationship with a particular resource provider.

The automatic rules may be used to create routing logic based on real-time network measurements. The network measurements may be determined by a gateway server that continuously or periodically monitors a set of transport computers. The gateway server may count failures or delays, along with maintaining a hysteresis threshold, for controlling the flow of authorization messages across different communication networks to different transport computers.

The gateway server may determine transport computer availability based on response codes, response times, and/or error screening. The gateway server may further determine expected-volume-specific mappings (e.g., based on seasonal volume changes). The gateway server may further determine routing rules based on percentages of requests to be routed (e.g., 50% to transport computer 1 and 50% to transport computer 2), response-time-based weightage rules, success/decline percentage-based rules, and throughput metric-based rules.

The routing decisions may further be based on user-defined rules. The user-defined rules may be configured via a routing administration interface. Users may provide preferences related to an order in which transport computers are selected. Alternatively, or additionally, users may configure rules for manual override of the routing logic.

A better understanding of the nature and advantages of embodiments of the present disclosure may be gained with reference to the following detailed description and the accompanying drawings.

BRIEF DESCRIPTION OF THE DRAWINGS

FIGS. 9A-9C are example interfaces for routing administration according to some embodiments.

TERMS

Figure 1A:
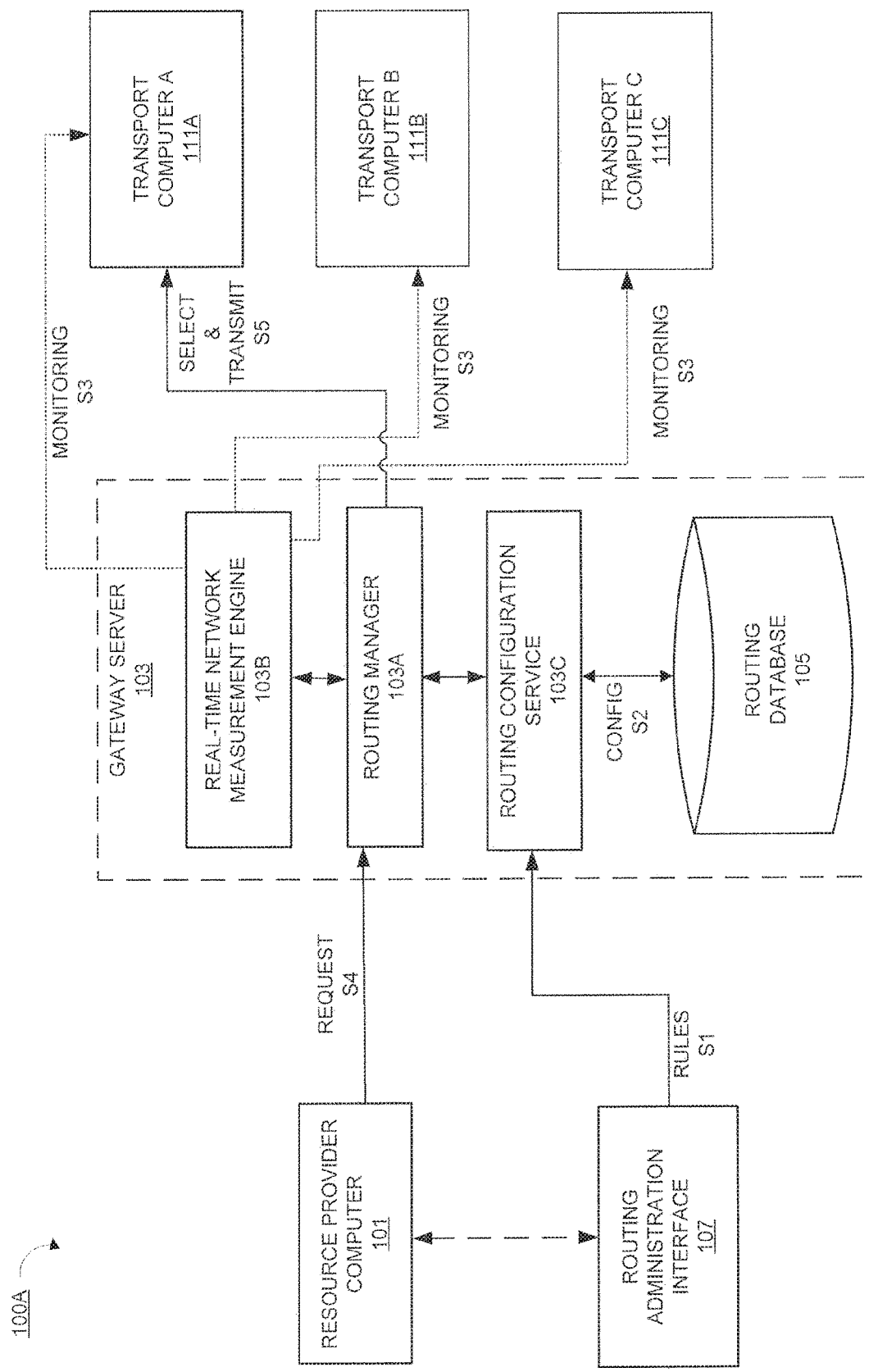
FIG. 1A is a schematic diagram showing an overview of a system and method for authorization routing according to some embodiments.

Prior to discussing various embodiments, description of some terms may be helpful in understanding embodiments of the disclosure.

The term "resource provider computer" may refer to a computer or computer system that engages in transactions and other electronic communications for providing access to goods or services. The resource provider computer may be associated with a "resource provider," which is an entity that can provide a resource such as goods, services, information, and/or access. Examples of resource providers includes merchants, data providers, transit agencies, governmental entities, venue and dwelling operators, etc.

The term "gateway server" may refer to a server computer that manages requests for a resource provider system. Such a gateway server may handle routing authorization request messages and response messages on behalf of a resource provider system, and may enable communication between a resource provider system and an associated transport computer.

The term "authorizing computer" may refer to a computer that receives authorization requests. The authorizing computer may access electronic records to determine an authorization response, thereby allowing a processing network to provide messages for other computers to coordinate authorization and settlement of a transaction. An authorizing computer may be associated with an issuer (e.g., a bank) that maintains accounts for users.

The term "transport computer" may refer to a computer that processes electronic payment communications on behalf of a resource provider system. A transport computer may receive authorization requests and settlement communications originating from a source address of a resource provider system, as well as authorization responses from source addresses of authorizing computers from which electronic payment message can also originate. A transport computer may be associated with an "acquirer," which may typically be a business entity (e.g., a commercial bank) that has a business relationship with a particular resource provider or other entity. Some entities can perform both issuer and acquirer functions. Some embodiments may encompass such single entity issuer-acquirers.

A "processing network" may be a computer used to support and deliver certificate authority services, authorization services, exception file services, and clearing and settlement services. The processing network may be a "payment processing network." An exemplary payment processing network may include VisaNet™. Payment processing networks, such as VisaNet™, may be able to process credit card transactions, debit card transactions, and/or other types of commercial transactions. The payment processing network may include one or more server computers. The payment processing network may use any suitable wired or wireless network, including the Internet.

As used herein, payment or purchase "transaction data/information" may refer to any information corresponding to or describing purchases, orders, invoices, payments involving goods, items, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

The term "communication channel" may refer to a particular source address and destination address (including intermediate addresses for routing) for communicating between two computers corresponding to the addresses. The communication channel can refer to a particular protocol (e.g., HTTP, TCP, UDP, etc.) and may have a specific set of associated encryption keys. The addresses may also specify particular ports, and thus two destination addresses can have a same IP address, but different ports.

The term "authorization request message" or "authorization request" may refer to an electronic message that is sent to a payment processing network and/or an authorizing of a payment account to request authorization for a transaction. An authorization request message according to some embodiments may comply with ISO 8583, ISO 20022, and/or ISO 8538/20022, which are standards for systems that exchange electronic transaction information associated with a payment made by a consumer using a payment device or payment account. The authorization request message may include a primary account number (PAN), or other identifying information, associated with a consumer payment device or payment account. An authorization request message may also comprise additional data elements corresponding to identification information including, by way of example only: a service code, a CVV/iCVV (card verification value), a dCVV (dynamic card verification value), a cryptogram (e.g., a unique cryptographic value for the transaction), an expiration date, etc. An authorization request message may also comprise transaction information, such as any information associated with a current transaction, such as the transaction amount, resource provider identifier (e.g., MVV, "resource provider verification value"), resource provider location, resource provider category code, etc., as well as any other information that may be utilized in determining whether to authorize a transaction.

An "authorization response message" or "authorization response" may refer to a message reply to an authorization request message. The authorization response message may include, by way of example only, one or more of the following status indicators: Approval—transaction was approved; Decline—transaction was not approved; or call center—response pending more information, resource provider must call the toll-free authorization phone number. The authorization response message may also include an authorization code, which may be a code that a credit card issuing bank returns in response to an authorization request message in an electronic message (either directly or through the payment network) to the resource provider's access device (e.g., POS equipment) that indicates approval of the transaction. The code may serve as proof of authorization.

The term "heartbeat message" may refer to a message sent to indicate whether a sending device is available or to determine whether a receiving device is available. Heartbeat messages can be sent periodically and continue to be sent while the sending entity is available. The absence of a heartbeat message may indicate that the sending entity is no longer available.

The term "handshake synchronization message" may refer to a message sent by one device to establish a communication channel with another device. The handshake synchronization message may be responded to with a handshake synchronization response message, indicating that the two entities are synchronized and capable of further communication.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

The present disclosure provides for methods and systems for intelligent routing in networked systems, such as a hospital computer network, distributed database, or a system used to manage transactions and facilitate payment for goods and services using a credit card. In these networked systems, there are multiple servers, computers, and processors, each of which have a role in a process. If a given computer is unavailable to perform its individual function in the network in an appropriate timeframe, then the performance of the entire network suffers. The methods and systems disclosed provide a solution to this problem, enabling networks to perform an intended function even when an individual computer, server, or processor is unavailable.

Although the examples and language below focus on a transactional context, the methods and systems described below may be applicable to more general network systems. The fundamental aspect of some embodiments of the disclosure is the ability to select an appropriate node in a network to which to route a message, based on network measurements and user-configured rules. This has advantages in many network schemes, particularly ones in which both speed and reliability are important.

An example of such a system is a cloud computing system including redundant servers. Such a system may perform computing operations on behalf of a large number of client computers (e.g., thousands of client computers may utilize a cloud computing system).

When a client computer transmits a request to process data to the cloud computing system, the cloud computing system may have hundreds of redundant servers that could potentially process the data. By intelligently routing the request to an optimal server computer, the data can be processed in the most efficient fashion.

Another example is a system for processing payments. Embodiments can include a system comprising a resource provider computer, a gateway server, a plurality of transport computers, a processing network, and an authorizing computer. In some embodiments, the resource provider computer creates authorization requests that are sent through the network to the authorizing computer. The resource provider computer receives authorization responses, which are sent through the network from the authorizing computer. An authorization request may be routed from the resource provider computer to the gateway server, then to a transport computer, then to the processing network, then reaching its destination at the authorizing computer. However, if a first choice transport computer is unavailable, or experiencing delay, another transport computer may be selected. In doing so, the authorization request can reach the authorizing computer in a timely fashion, even if the first choice transport computer is unavailable or experiencing a delay. This provides a considerable advantage over conventional systems and methods of authorizing requests.

Embodiments of the disclosure provide for advantages over conventional systems and methods because conventional systems and methods used in authorizing authorization requests are unable to intelligently route messages to an appropriate transport computer based on network measurements and user-defined rules. As a result, conventionally, delays or complete failures may occur based on blindly routing messages to a fixed computer. For example, in a conventional system for processing authorization requests, if a transport computer corresponding to a given resource provider is unavailable, the authorization request cannot be processed because the transport computer cannot receive the authorization request and forward it to the payment network. Short of a complete failure, transport computers may experience spikes in volume, which can slow down the processing of requests. By contrast, embodiments of the disclosure can identify one of several transport computers to which to route an authorization request, thus allowing requests to be authorized quickly, even if a given transport computer is unavailable or experiencing delays. The result is a more seamless and efficient networking environment.

The various computers and other network entities and how they interact and communicate with one another is described below, along with a description of some of the individual entities themselves. Methods by which the gateway server may route authorization requests through different transport computers depending on factors such as transport computer availability, expected volume, and/or static rules are also provided. Examples of determining the availability of the transport computer on the network is followed by a discussion of how expected volume of a transport computer may be determined. Methods for computing a decline/success ratio are described. Finally, example routing configuration interfaces are described.

I. Overview of Smart Routing System and Method

Figure 1B:
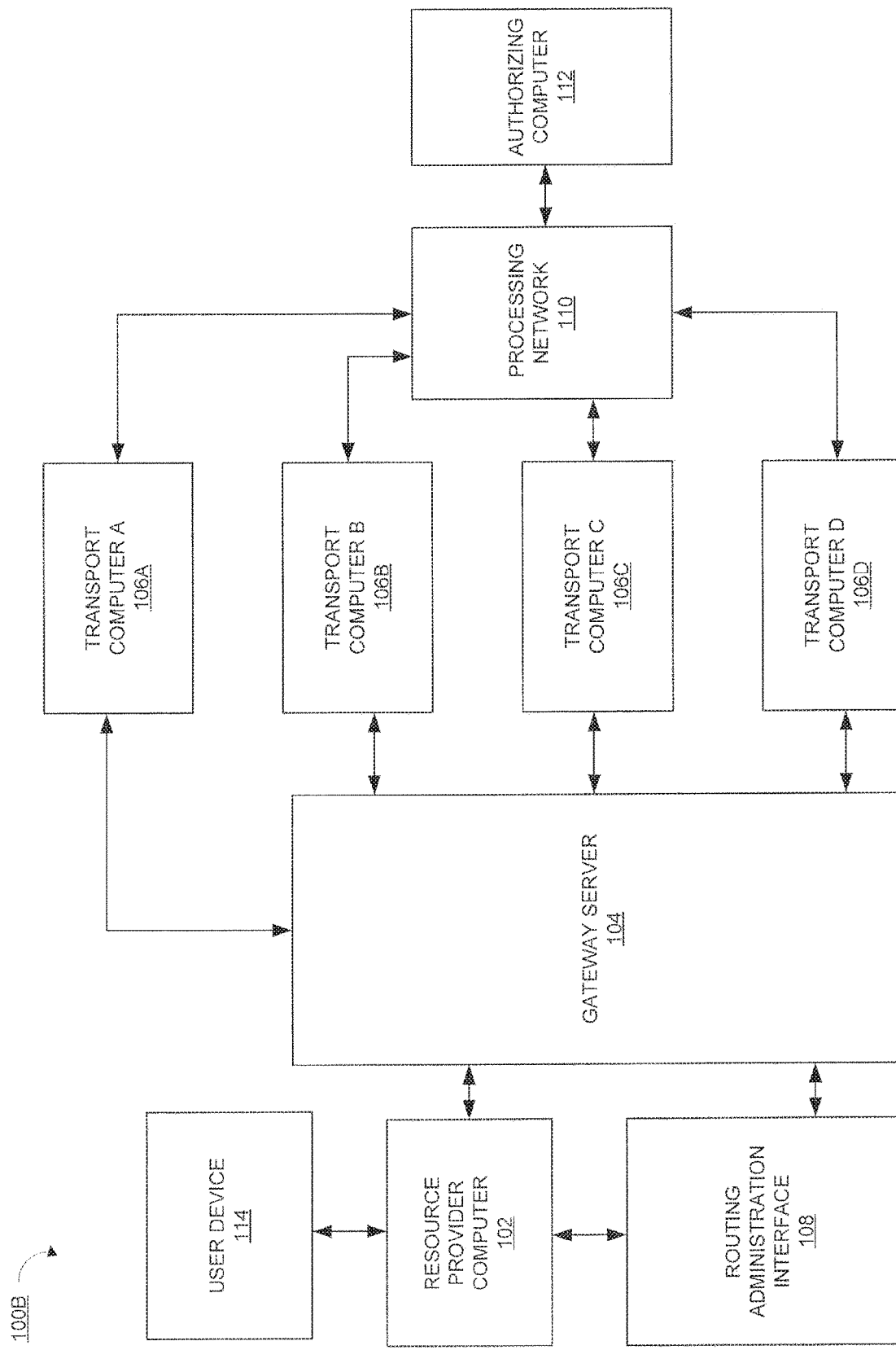
FIG. 1B is a block diagram showing an overview of an authorization routing system according to some embodiments.

FIG. 1A is a schematic diagram showing an overview of a smart routing system and method 100A according to some embodiments. As shown, system 100A includes resource provider computer 101, gateway server 103, a plurality of transport computers (e.g., transport computer A 111A, transport computer B 111B, and transport computer C 111C), and routing administration interface 107. Other network devices may exist between the individual network computers shown, e.g., Internet routers, whose function is known to one skilled in the art. The system 100A may further include additional components to which the transport computers may route messages, as shown in FIG. 1B. The details of the functionalities of these components are described in detail below in Section II.

At an initial time the routing administration interface 107 may accept rule parameters from a user, such as an administrator associated with a resource provider. The routing administration interface 107 may, directly or via another device such as the resource provider computer, display interface elements for accepting user-configured rules. For example, a user may specify a primary transport computer and a set of conditions for using one or more backup transport computers. An example of such an interface is illustrated in FIG. 9A and described in Section VII.

At step S1, the routing configuration service 103C may retrieve the user-configured rules from the routing administration interface 107. The routing configuration service 103C may convert the rules into a suitable form and, at step S2, store the configuration rules to the routing database 105. The routing configuration service 103C may accept different rule sets from various different resource providers. The rules may be stored in association with the resource provider for which the rules were configured. The routing database 105 may store a plurality of different rule sets configured based on the preferences of different resource providers.

At step S3, the real-time network management engine 103B may monitor a plurality of transport computers. FIG. 1A illustrates three transport computers, transport computer A 111A, transport computer B 111B, and transport computer C 111C, for simplicity of illustration. However, the real-time network management engine 103B may monitor many (e.g., hundreds or thousands of) transport computers. Monitoring the transport computers may involve retrieving data such as error codes and responses with timestamps from the transport computers. The responses with timestamps may be used to determine response times. Such data may be gathered by sending messages, such as request messages and handshake messages, to the transport computers. Alternatively, or additionally, data may be gathered from the transport computers by listening for heartbeat messages. Various methods of monitoring the transport computers are described in detail below in Sections III-VI.

At step S4, the routing manager 103A may receive a request from resource provider computer 101. The request may be an authorization request.

At step S5, the routing manager 103A selects a transport computer to which to transmit the request. Typically, such a request would be routed to a predetermined transport computer (e.g., based on a business relationship between the resource provider and the entity managing the transport computer). In contrast, using the smart routing method, the routing manager leverages the user-configured rules in the routing database and the real-time network measurements gathered by monitoring the set of transport computers to make a routing decision and select a transport computer. The routing manager may, for example, calculate a score for each potential transport computer and select a transport computer to which to route the request based on the score. Selecting a transport computer is described in detail below in Section III. Upon selecting the transport computer, the routing manager 103 transmits the request to the selected transport computer.

II. System Including Multiple Transport Computers

The system according to some embodiments includes a series of computers and server(s). These include a resource provider computer, a gateway server, a plurality of transport computers, a processing network, and an authorizing computer. Authorization requests and responses are routed between the resource provider computer, the transport computers, and the authorizing computer by the gateway server and the processing network. The gateway server selects an optimal transport computer to which to route authorization requests and/or responses, based on criteria such as network measurements determined by monitoring the transport computers, predicting an expected volume for the transport computers, and/or predefined routing rules.

The system may further include a routing administration interface to accept user-defined parameters and display information to a user. The system may cause display of interface elements enabling a user, such as an administrator associated with a resource provider, to configure routing preferences. For example, the user may select a first choice, second choice, and third choice of transport computers to which to route authorization requests. The routing interface may further accept input to configure routing criteria (e.g., to weight pricing higher than timing in a routing decision, or vice versa). The routing administration interface may further display information about the health status of one or more transport computers.

A. System Overview

FIG. 1B is a block diagram showing an overview of an authorization routing system 100B according to some embodiments. Some elements of FIG. 1B can correspond to elements in FIG. 1A. As shown, system 100B includes resource provider computer 102, gateway server 104, a plurality of transport computers (e.g., transport computer A 106A, transport computer B 106B, transport computer C 106C, and transport computer D 106D), processing network 110, authorizing computer 112 routing administration interface 108, and user device 114. Other network devices may exist between the individual network computers shown, e.g., Internet routers, whose function is known to one skilled in the art. In the example shown, gateway server 104 may select one of four transport computers in transmitting an authorization message towards a final destination of authorizing computer 112.

The user device 114 may be any suitable device operated by a user, such as a computer, smartphone, tablet, etc. Alternatively, user device may be an internet-of-things capable device configured to perform operations on behalf of a user. The user device 114 may transmit information to the resource provider computer 102 for initiating an interaction, such as a request for access to a resource. For example, a user may, via a smartphone, enter payment information and select items for purchase, which is then transmitted to the resource provider computer 102 for processing.

The resource provider computer 102 may communicate electronically with user device 114, e.g., over the Internet or another network. The resource provider computer 102 may receive identifying information from user device 114. This information may take different forms depending on the context of the communication.

In some embodiments, the resource provider computer 102 may receive identifying information such as an IP or MAC address from user device 114, e.g., in implementations where user device 114 is authenticated. In cases where security is more important, the resource provider computer 102 may receive a hash that can be verified by the resource provider computer 102 or by an authorizing computer 112. In other cases, the resource provider computer 102 may receive an encrypted message. The resource provider computer 102 or the authorizing computer 112 may decrypt the message and compare it to an expected message. If the decrypted message matches the expected message, the user device 114 can be identified. Identifying information may also take the form of payment credentials from consumers, such as a Personal Account Number or PAN, as well as other credentials or identifying information, such as a home address, zip code, credit card CVV2 value, credit card expiration date, and full legal name.

The resource provider computer 102 can additionally generate authorization requests. The authorization requests can relate to an interaction between the resource provider computer 102 and user device 114. For example, the resource provider computer 102 may generate an authorization request in order to request authorization from a third party for an interaction between the resource provider computer 102 and user device 114. The third party may be the authorizing computer 112. Authorization request messages may be encrypted or unencrypted, sent over a direct or distributed network (such as the Internet), and take any suitable form for electronic communication. The various components of the resource provider computer 102 for performing such functions are described below with respect to FIG. 3.

As another example, user device 114 may request a protected or sensitive record from the resource provider computer 102, such as a patient medical history record. The user device 114 may provide identifying information to the resource provider computer, such as a user ID and password. The resource provider computer 102 may generate an authorization request message in order to verify the identity of the user device 114, in order to determine if the user device 114 is authorized to receive the medical history record.

As another example, a user device 114 may belong to a consumer, who wishes to acquire a good or service from the resource provider computer 102. The user device 114 may provide identifying information, such as a PAN. The resource provider computer 102 may generate an authorization request message, including the PAN, and transmit it in order to receive authorization to complete a transaction.

The gateway server 104 may receive authorization requests or other requests from resource provider computers and service those requests. Examples of other requests include settlement requests and capture requests. The gateway server 104 may take the form of a payment gateway that provides access to the communication infrastructure shown in system 100B for many resource provider computers, e.g., by parsing and analyzing the content of payment request messages. The gateway server 104 may provide additional functionality, such as generating a record of serviced requests.

As part of providing access to the authorization infrastructure, the gateway server 104 may establish communication, over a communication channel, with a transport computer. Gateway server 104 may be configured to communicate with various transport computers. To identify the correct transport computer for a given authorization request, the gateway server 104 may use a combination of static rules and real-time network measurements. For example, the gateway server 104 may include a database storing rules for each of a plurality of resource providers. Each resource provider may have relationships with different respective sets of acquirers corresponding to different transport computers. The rules may include rules configured by the resource providers (e.g., an order of preference of three potential transport computers), as well as general routing rules (e.g., select the nearest node and/or lowest-cost option). The gateway server 104 may further analyze transport computer behavior and patterns to determine expected volumes and transport computer health and availability, which may also be used in a routing decision. The various components of the gateway server 104 for performing such functions are described below with respect to FIG. 2.

Such "smart routing" presents a number of advantages. The gateway server can select one of several transport computers to which to transmit messages such as authorization request messages. Accordingly, even if one or more transport computers are experiencing failures or delays, a request can be processed in a near-real-time fashion. Further, transport computers can be selected using a rich data set available to the gateway server. A gateway server can forward requests across a great number of different resource providers and transport computers. Further, a gateway server may be configured to process the requests sent between such devices and utilize the data therein. Thus, the gateway server has a great breadth of data to use in making informed decision as to when a transport computer is likely to experience a delay. This, in conjunction with the position of the gateway server as a node through which messages pass early in a transaction, makes routing to different transport computers by the gateway server highly advantageous.

The transport computers (e.g., transport computer A 106A, transport computer B 106B, transport computer C 106C, and transport computer D 106D) may manage one or more resource provider accounts for resource provider computer 102. The transport computers may route requests, such as authorization request messages, authorization response messages, settlement requests, or capture requests. As part of settlement, a transport computer may debit or credit a resource provider account associated with the resource provider computer 102.

The transport computers (e.g., transport computer A 106A, transport computer B 106B, transport computer C 106C, and transport computer D 106D) may also communicate with the processing network 110. These communications may take place electronically over the Internet or through another suitable network. These communications primarily take the form of authorization requests, authorization responses, settlement requests, or other settlement messages, although they could take other forms depending on the needs of the transport computers or the authorizing computer 112. For example, a transport computer and an authorizing computer 112 may be in disagreement regarding the status of a settlement request. In this case, the transport computer may communicate with the processing network 110 to facilitate communication with the authorizing computer 112. In general, the transport computer can communicate with the processing network 110 for routing the communications to their intended recipient, e.g., a specific authorizing computer 112.

The processing network 110 can facilitate communication of messages and tracking of information between one or more transport computers (e.g., transport computer A 106A, transport computer B 106B, transport computer C 106C, and/or transport computer D 106D) and one or more authorizing computers (e.g., the authorizing computer 112). For example, the processing network 110 can receive an authorization request message from a transport computer and analyze the authorization request message to determine that the authorizing computer 112 is associated with the authorization request message. Such identification of the corresponding authorizing computer may be performed by analyzing a portion of the account number that corresponds to a bank identification number (BIN), which can be used to access a database that has the corresponding authorizing computer stored in association with the BIN. The processing network 110 can forward the authorization message received from the transport computer to the authorizing computer 112 for authorization. The processing network 110 can then receive authorization response messages from the authorizing computer 112 and further transmit the authorization response messages to the transport computer.

The routing administration interface 108 may include software and/or hardware configured to accept user input configuring routing rules. The routing administration interface 108 may further include functionality for displaying information to a user (e.g., an administrator associated with a resource provider).

The routing administration interface 108 may, directly or via the resource provider computer 102, cause display of interface elements for configuring routing rules. Such an interface is shown in FIG. 9A and described in Section VII. As an example, the routing administration interface 108 may transmit instructions to the resource provider computer 102, thereby causing the resource provider computer to generate, and cause display of, interface elements such as links, modals, images, text, etc. A user may interact with such interface elements. The user may initiate generation of a rule by, for example, clicking on a button or URL. The rule may be generated and transmitted to the gateway server 104.

The resource provider computer 102 and/or a user device 114 (e.g., of an administrator) may further include functionality for presenting the routing administration interface 108. The resource provider computer 102 may include a display, such as a screen, for displaying interface elements. The resource provider computer 102 may include elements for accepting user input, such as a keyboard, mouse, voice detection hardware/software, and/or the like. Based on configuration options displayed via the routing administration interface 108 on the display element, the resource provider computer 102 may accept configuration data via the user input element(s).

The authorizing computer 112 can receive and analyze authorization request messages, e.g., to identify a stored record that corresponds to the account information provided in the request. Authorization response messages can then be created. Such authorization response messages may contain an indication of whether or not the authorization request message is authorized, as well as information regarding the authorization status of the request or other information. Such information may include a status indicator (such as approval, decline or call center). It may also include a timestamp. The timestamp may indicate the time at which the authorization request was sent and/or the time at which the authorization response was sent. This information may also include an authorization code, which may serve as proof of authorization. The authorization code may be used as part of a later capture request. Authorization codes and other information related to the authorization status may be useful for the purposes of record keeping, as capture requests frequently take place at a later time than authorization requests.

The network computers in FIG. 1 may communicate over a distributed network such as the Internet, or via a series of direct connections, a hybrid of the two, or any other appropriate method of communication between entities. Further, in some embodiments, there may be multiple resource provider computers, gateway servers, transport computers, processing networks 110, authorizing computers 112, routing administration interfaces 108, and/or user devices 114.

B. Gateway Server

Figure 2:
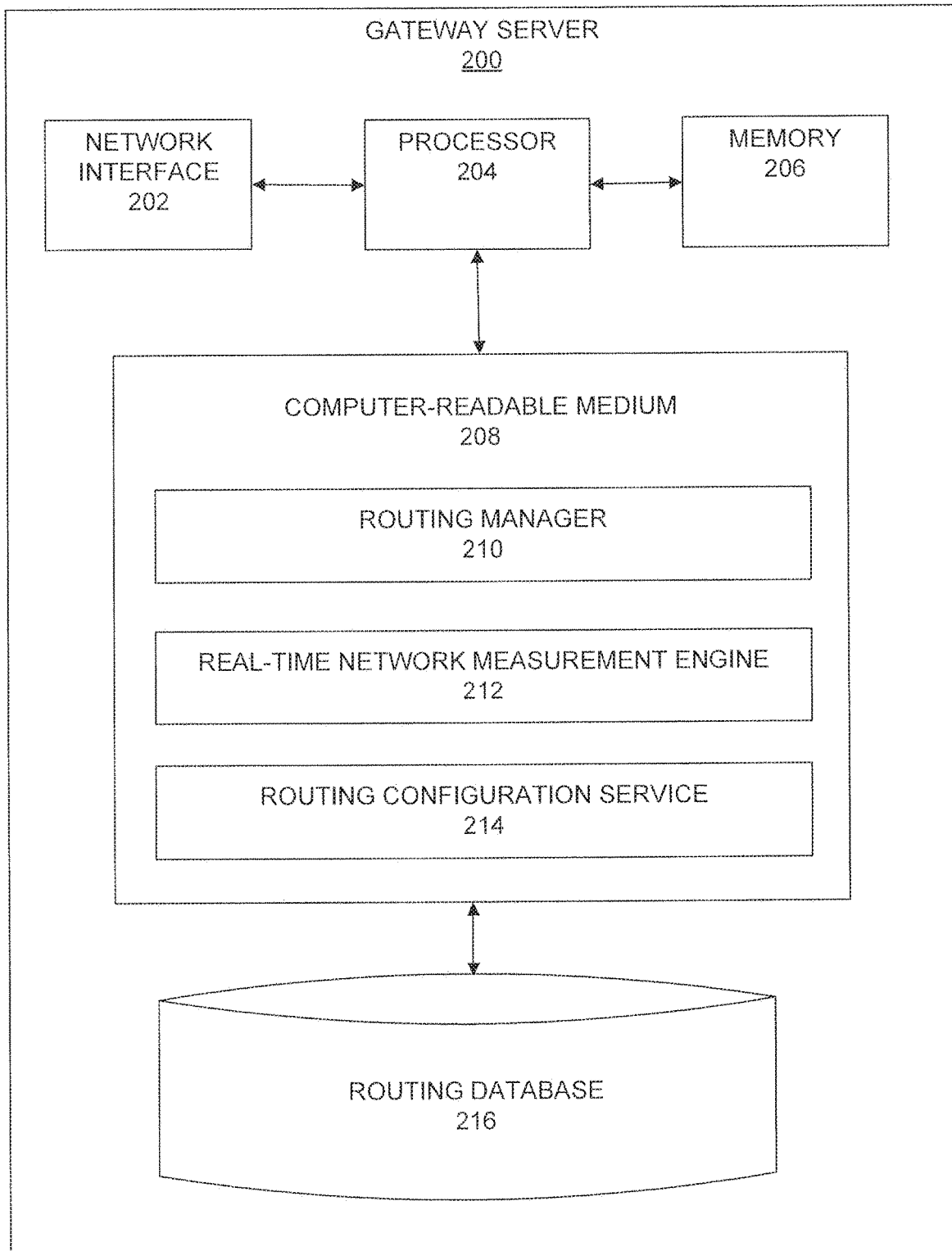
FIG. 2 is a block diagram showing a gateway server according to some embodiments.

FIG. 2 is a block diagram showing a gateway server 200 according to some embodiments. Gateway server 200 may comprise hardware and/or software configured to route messages between a resource provider computer and one or more transport computers. The gateway server 200 may include a processor 204 operatively coupled to a network interface 202, a memory 206, and a computer-readable medium 208. The gateway server 200 may further comprise a routing database 216.

The processor 204 may be implemented as one or more integrated circuits (e.g., one or more single core or multicore microprocessors and/or microcontrollers). The processor 204 may be used to control the operation of the gateway server 200. The processor 204 can execute a variety of programs in response to program code or computer-readable code stored in memory 206. The processor 204 may include functionality to maintain multiple concurrently executing programs or processes.

The network interface 202 may be configured to connect to one or more communication networks to allow the gateway server 200 to communicate with other entities such as a resource provider computer, transport computers, routing administration interface, etc. For example, communication with the transport computers can be direct, indirect, and/or via an API.

The memory 206 may be implemented using any combination of any number of non-volatile memories (e.g., flash memory) and volatile memories (e.g., DRAM, SRAM), or any other non-transitory storage medium, or a combination of media.

The computer-readable medium 208 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices.

The computer-readable medium 208 may comprise software code stored as a series of instructions or commands. The computer-readable medium 208 comprises code, executable by the processor 204, to implement methods as described herein. The computer-readable medium 208 may comprise a routing manager 210, a real-time network measurement engine 212, and a routing configuration service 214. Each of these modules may include code configured to perform the functions described below in conjunction with the processor 204.

The real-time network measurement engine 212 may include code configured to detect a measure of availability of one or more transport computers. This may involve recording, counting, and/or analyzing handshake messages, authorization response messages, acknowledgement messages, and/or heartbeat messages in order to determine the transport computer's availability. The real-time network measurement engine 212 may communicate with the routing manager 210 to provide the gathered information to the routing manager 210. The routing manager 210 may then use the provided information to route messages to an optimal destination. Methods of detecting the measure of availability of the transport computer are discussed in further detail below with respect to FIGS. 4-6.

The routing configuration service 214 may include code configured to receive and process user-defined routing configuration parameters. The routing configuration service may be in communication with the routing administration interface. The routing configuration service 214 may transmit information to the routing administration interface, so that appropriate configuration options may be displayed to a given resource provider. The routing configuration service 214 may retrieve user-defined rules from the routing administration interface (e.g., routing administration interface 108, described above with respect to FIG. 1B). The routing configuration service 214 may store the user-defined routing rules to the routing database 216.

The routing manager 210 may include code configured to route authorization requests and/or other messages The routing manager may obtain real-time network measurements about one or more transport computers from the real-time network measurement engine 212. The routing manager may obtain user-defined routing preferences from the routing configuration service 214 and/or routing database 216. The routing manager may further obtain static rules from the routing database. Any combination of these factors, along with the additional factors described below, may be used by the routing manager 210 to make a routing decision.

The routing manager 210 may further include code configured to perform analysis for routing decisions. The routing manager 210 may predict an expected volume. An expected volume may be predicted based on recent volume. Alternatively, or additionally, an expected volume may be predicted based on historical volume analysis. The routing manager 210 may compare historical parameters, retrieved and stored in the course of processing prior authorization requests, with corresponding parameters corresponding to a current authorization request. As an example, historical data may show that a particular set of transport computers based in the western United States historically experience spikes in volume around 9 AM on "black Friday," a particular busy shopping day in the region. Accordingly, the routing manager 210 may predict a high volume for these transport computers at this time. The routing manager 210 may determine various other metrics for use in the routing decision, such as response times, success/decline ratios, response ratios, and static rules, as described in detail below with respect to FIGS. 4-8.

The routing manager 210 may further include code configured to process authorization requests and responses. This may involve interpreting the contents of the message to determine the message's final recipient and an authorization status. It may also involve storing some or all of the information in a database, such as routing database 216, for future access. The routing manager 210 may additionally decrypt or encrypt authorization requests and responses. As an example, the routing manager 210 may decrypt an authorization response message in order to extract and interpret the content of the message. Before the authorization response message is sent to the appropriate resource provider computer, the routing manager 210 may encrypt the message again for safe transmission.

The routing manager 210 may further prepare messages for routing to the selected destination. This may involve evaluating network addresses, and determining an appropriate communication protocol or standard. Further, routing manager 210 may format the authorization requests or responses such that they conform to the appropriate communication protocol. As an example, routing manager 210 may determine that routing an authorization request to the transport computer requires the use of the Transmission Control Protocol, and the message should conform to ISO 8583. The routing manager 210 may format the message such that it confirms to both the protocol and the standard, then route the message to the transport computer for further processing. If a request is determined to be fraudulent, routing manager 210 may send an authorization response message to the merchant computer system, indicating that the request has been denied.

The routing database 216 may be a be a storage unit and/or device (e.g., a file system, database, collection of tables, or other storage mechanism) for storing data. The routing database 216 may store routing rules. Such rules may be stored in association with a plurality of different resource providers. Each of the resource providers may define their own routing preferences (e.g., via the routing administration interface). Alternatively, or additionally, the routing database 216 may store general rules (e.g., route to transport computer expected to process the request fastest, and/or route to the lowest-cost transport computer).

In some embodiments, the gateway server 200 may further include hardware and/or software configured to analyze transaction data to identify whether specified criteria are met or otherwise conduct a fraud evaluation for a request to access a resource. If the gateway server 200 determines that the transaction may be fraudulent, then gateway server 200 may determine that the transaction should be denied and not forwarded to other network entities for the purpose of obtaining an authorization response message. If the gateway server 200 determines that the transaction is not fraudulent, then the gateway server 200 may determine that the transaction should be allowed. If the gateway server 200 is unable to determine whether the transaction is fraudulent, then the gateway server 200 may send the transaction to the transport computer or the processing network for further review.

C. Resource Provider Computer

Figure 3:
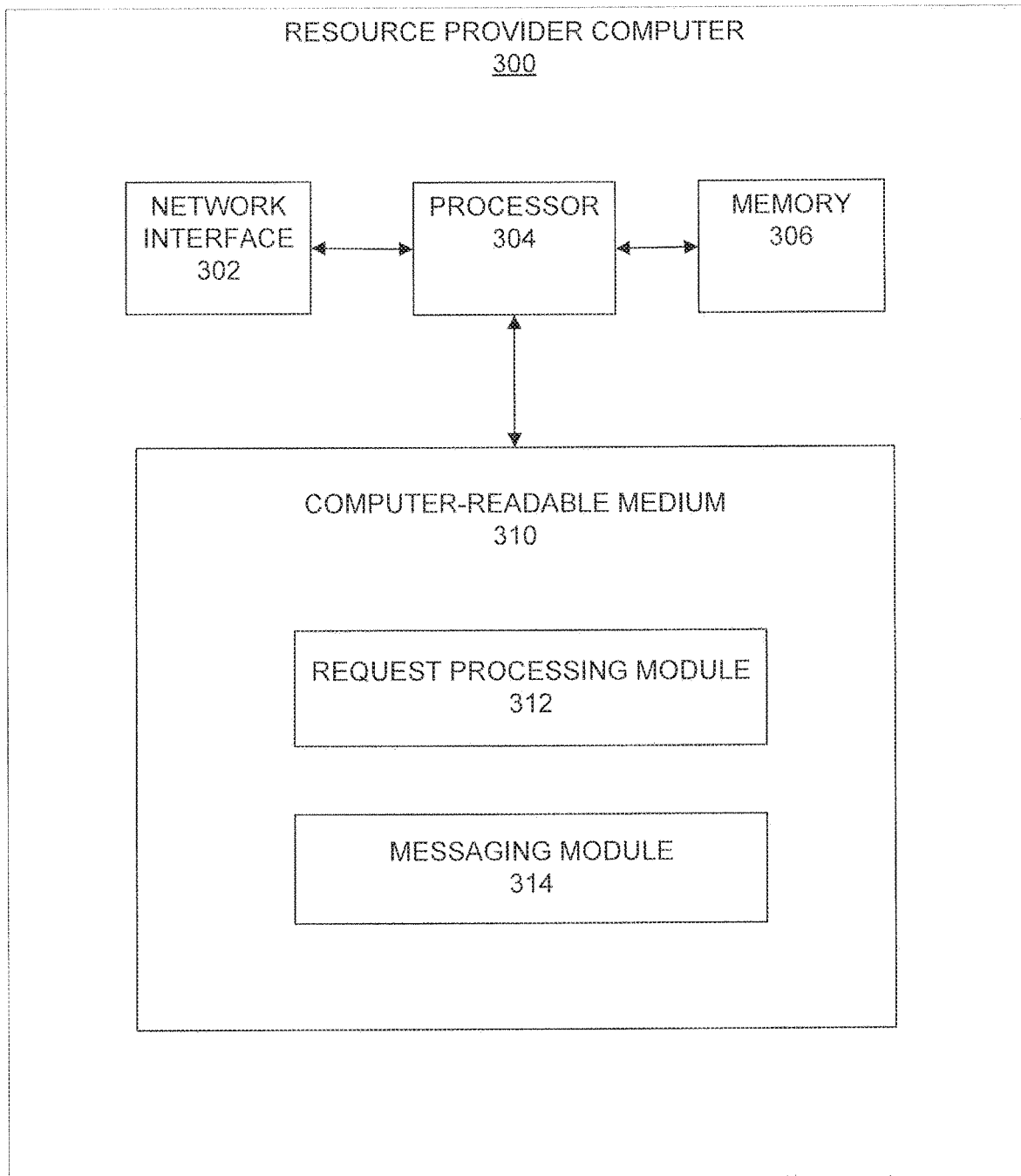
FIG. 3 is a block diagram showing a resource provider computer according to some embodiments.

As depicted in FIG. 3, the resource provider computer 300 may comprise hardware and/or software configured to generate and transmit authorization requests to initiate a request for access to a resource. The resource provider computer 300 may include a processor 304 operatively coupled to a network interface 302, a memory 306, and a computer-readable medium 310.

The processor 304, the network interface 302, and the memory 306 may be substantially similar to the processor 204, the network interface 202, and the memory 206, as described above with respect to FIG. 2.

The computer-readable medium 310 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 310 may be any combination of such storage or transmission devices.

The computer-readable medium 310 may comprise software code stored as a series of instructions or commands. The computer-readable medium 310 comprises code, executable by the processor 304, to implement methods as described herein. The computer-readable medium 310 may comprise a request processing module 312 and a messaging module 314.

The messaging module 314 may comprise code for preparing and transmitting messages. The messaging module 314 may further be configured to accept and analyze messages. The messaging module 314 may include functionality to transmit authorization request messages and to receive authorization response messages. The messaging module 314 may be configured to prepare and transmit notifications (e.g., upon determining that a request has been declined).

The request processing module 312 may include software configured to process requests, such as authorization requests. The request processing module 312 may receive transaction information from a user device of a user requesting access to a resource. For example, the request processing module 312 may receive, from the user device, transaction information such as payment information, goods to be purchased, the name and the address of the user, and so forth. The request processing module 312 may use the received information to generate an authorization request message. The request processing module 312 may process authorization response messages, specifying an authorization result whether a request is approved or declined. Based on the authorization result, the request processing module 312 may proceed with processing the request, or notify the messaging module 314 that the request has been declined.

III. Smart Routing Method

In general terms, the "smart routing" method involves a gateway server facilitating the transmission of authorization request messages to one of a plurality of transport computers. An appropriate transport computer may be selected based on factors such as error codes, real-time network measurements, and/or expected volumes. This smart routing method may involve receiving authorization request messages, then determining the availability and expected volume of the transport computers, and routing the authorization request messages to the appropriate transport computer.

Figure 4:
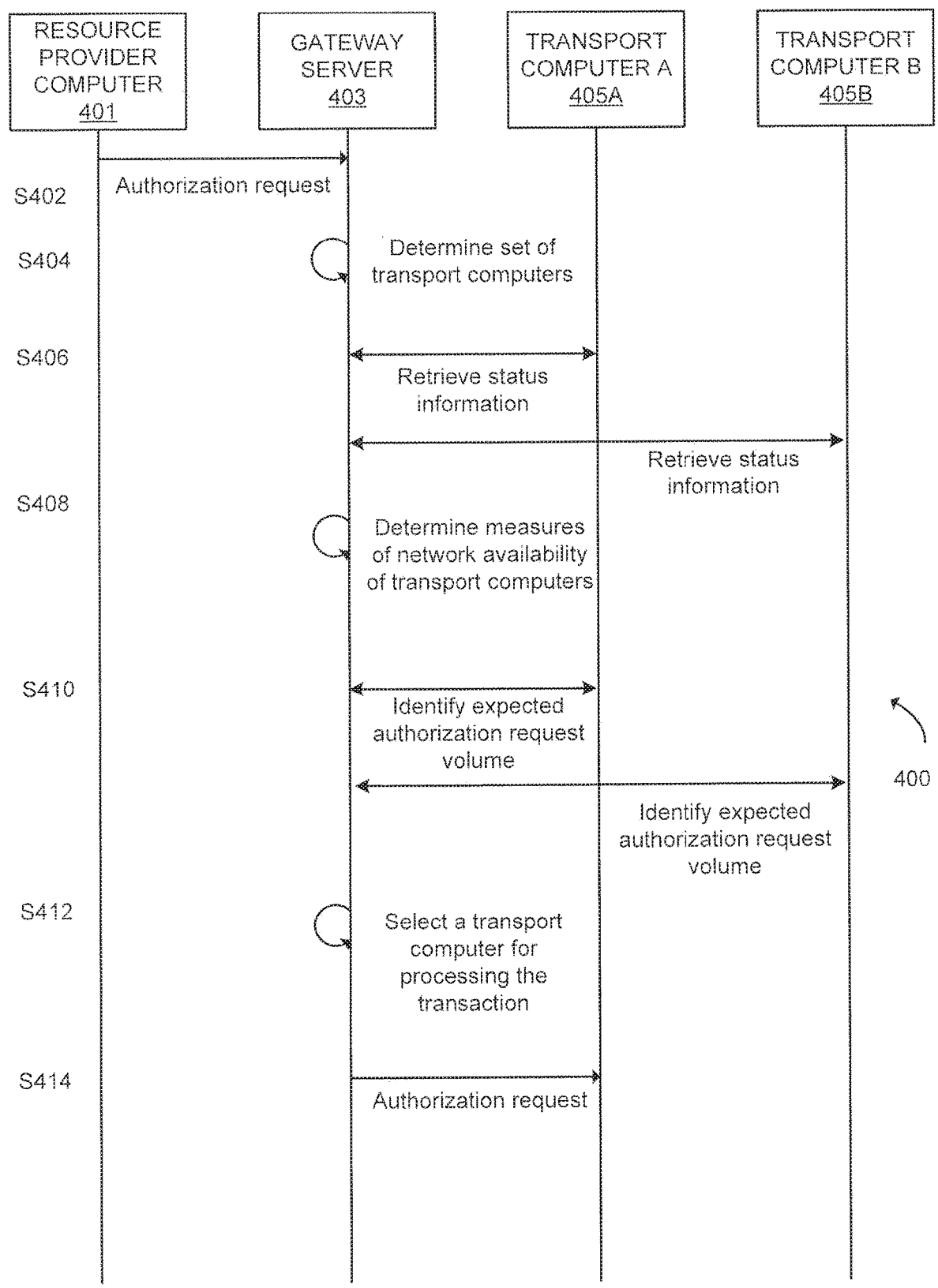
FIG. 4 is a sequence diagram showing smart authorization routing of messages according to some embodiments.

FIG. 4 is a sequence diagram showing a method 400 detailing authorization routing according to some embodiments of the invention. The resource provider computer 401, gateway server 403, transport computer A 405A, and transport computer B 405B correspond to the resource provider computer 102, gateway server 104, transport computer A 106A, and transport computer B 106B, described above with respect to FIG. 1, respectively. Although two transport computers are shown for simplicity of illustration, a larger set of transport computers may be involved.

At step S402, the resource provider computer 401 prepares an authorization request, associated with a request for access to a resource, and transmits the authorization request to the gateway server 403. The authorization request may comply with ISO 8583, or another standard for electronic communications, and may include identifying information such as a resource provider identifier. The authorization request may include various types of identifying information which may be used for authorization, such as a username, password, PAN, or any of the other examples of identifying information recited above, among other forms of identifying information. The gateway server 403 receives the authorization request.

At step S404, the gateway server 403 determines a set of transport computers. The gateway server 403 may determine the set of transport computers based on the resource provider. The gateway server may use a resource provider identifier extracted from the authorization request to identify a set of transport computers available to the resource provider. For example, a first resource provider may have a relationship with two acquiring banks, with two or more corresponding transport computers that may process an authorization request. A second resource provider may have a relationship with one acquiring bank and one third-party acquirer processor, with two or more corresponding transport computers that may process an authorization request. According, based on relationships established by the resource provider, different sets of transport computers may be available. The appropriate set of transport computers may be identified by retrieving a stored mapping based on the resource provider identifier.

At step S406, the gateway server 403 retrieves status information from the determined set of transport computers (e.g., transport computer A 405A and transport computer B 405B). The gateway server 403 may transmit a message to each transport computer (e.g., an authorization request message, or a handshake message). In response, the gateway server 403 may receive a response message with a corresponding timestamp, indicating a response time. Alternatively, or additionally, the response message may comprise one or more error codes. Alternatively, or additionally, the gateway server 403 may remain in a listening state to wait for continually transmitted messages such as heartbeat messages from the transport computers.

At step 408, the gateway server 403 determines respective measures of network availability of the transport computers 405A, 405B. The gateway server 403 may determine the measures of network availability using one or more of error codes, response times, ratios of connection successes to failures, or ratios of recorded missed heartbeats to expected heartbeats.

In some embodiments, this determination may involve analysis of the receipt rate of a first set of authorization requests. As an example, the gateway server 403 may compare a number of authorization requests sent to each transport computer versus the number of authorization requests acknowledged (e.g., by an acknowledgement message) as being received by the transport computer. The gateway server 403 may further determine the response time associated with the transport computers.

Analyzing receipt of authorization requests received can be accomplished in a number of ways. For example, the transport computer may transmit an electronic receipt message to the gateway server 403 for each of the first authorization request messages. This electronic receipt message may indicate that the transport computer has received the given first authorization request. In other cases, it may be appropriate to use different messages to indicate the number of authorization requests received.

For example, according to TCP, computers send a series of handshake messages back and forth in order to establish a communication channel. It is presumed that once a communication channel has been established, the message will be received by the receiving party, in this case the transport computer. If a handshake message is not received, the communication channel cannot be established, and a given first authorization request cannot be received by the transport computer. Thus, the availability of the transport computer may be determined by comparing the number of handshake messages sent to handshake responses received.

Other methods can be used to determine the measure of availability of the transport computers. In some embodiments, heartbeat messages are used to determine the availability of a transport computer. Heartbeat messages can be short messages, and can be y sent at a predetermined rate to one or more computers in a network. The heartbeat messages indicate to their recipient that the computer sending the heartbeat messages is available for communication. In some embodiments, the gateway server 403 may receive heartbeat messages periodically from the transport computers. The gateway server 403 may compare the number of heartbeat messages received to an expected number of heartbeat messages in order to determine the availability of the transport computer. Further, the gateway server 403 may determine a ratio of the number of heartbeat messages received to the expected number of heartbeat messages and compare the ratio to a predetermined threshold. As an example, the heartbeat messages are sent on average once per second. The gateway server 403 may calculate the expected number of heartbeat messages received over an arbitrary time period. Over the course of 30 minutes, the gateway server expects to receive 1800 heartbeat messages. If the gateway server instead receives 1000 heartbeat messages, then the ratio of received heartbeat messages to expected heartbeat messages is 0.556. This ratio may be compared to that of other transport computers in determining the transport computer to which to transmit the authorization request. Methods used to determine the measures of network availability of the transport computers 405A, 405B are discussed in further detail below in Section IV.

At step 410, the gateway server 403 identifies expected volumes of authorization requests for the transport computers 405A, 405B. The gateway server 403 may determine the expected authorization request volume by analyzing recent volumes and/or comparing current transport computer parameters to historical transport computer parameters. Methods used to determine the expected volume for the transport computers 405A, 405B are discussed in detail below in Section V.

At step 412, the gateway server 403 selects a particular transport computer (e.g., transport computer A 405A or transport computer 405B) for processing the request. The gateway server 403 may select the particular transport computer for processing the request based on the determined measures of network availability and/or expected volume of the transport computers. The gateway server may use additional factors in making a routing determination, such as predefined rules, success/decline rates, and throughput metrics. Such factors may be combined to arrive at a score, or "health score," for a transport computer. The gateway server 403 may select the transport computer for processing the request based on the score (e.g., by selecting the transport computer with the highest or lowest score, depending on the scoring system used).

The gateway server 403 may use predefined rules for transport computer selection in making a routing determination. The gateway server 403 may retrieve such predefined rules from the routing database. As described above with respect to FIG. 1A, some or all of the rules may be stored in association with different resource providers. Based on, e.g., a resource provider identifier, the gateway server 403 may retrieve a rule set. Such rules may accepted via user input. For example, a particular resource provider may generally prefer to use a particular transport computer based on a favored relationship. The rules for this resource provider may then specify that the particular transport computer should be utilized, unless that transport computer is in a failure state. In the event the particular transport computer is in a failure state, the resource provider may specify one or more backup transport computers to which messages may be routed.

Other examples of predefined rules include sending a certain percentage of requests to each of a set of transport computers (e.g., 70% to transport computer A, 20% to transport computer B, and 10% to transport computer C) and routing based on request details (e.g., transaction channel (e.g., card present, card not present, chip, stripe, PIN, etc.), currency, country, amount, etc.). In some embodiments, the user-configured rules may be used to override routing logic. For example, a rule may specify that, even if a preferred transport computer is experiencing a delay, that transport computer should be used. User selection of rules via such an interface is described in detail below in Section VII. Alternatively, or additionally, the gateway server 403 may use predefined default rules across resource providers (e.g., choose the nearest node, choose the fastest computer, etc.).

The gateway server 403 may further use success/decline rates in making a routing determination. If messages processed by a transport computer are declined at a relatively high rates (e.g., compared to other transport computers and/or previous points in time), this may indicate that the transport computer is passing on inaccurate data and is not an optimal message destination.

The gateway server 403 may further use throughput capacity in making a routing determination. The throughput capacity may indicate the number of requests a particular transport computer is capable of processing in a particular period of time. The throughput capacity of each transport computer may be determined at an initial time. For example, the gateway server 403 may retrieve information from transport computer A 405A and transport computer B 405B indicating one or more of a type of the transport computer, a processing speed of the transport computer, and/or the throughput capacity of the transport computer. The gateway server may calculate the throughput capacity for a transport computer if it is not provided directly.

The gateway server 403 may combine various metrics as described above in computing a score for each of a plurality of transport computers. The score may be computed, for example, via a decisioning algorithm which combines various static rules and real-time network measurements in reaching a routing decision. For example, for a particular resource provider, the decisioning algorithm may specify to select the transport computer with the highest score (e.g., an optimal node for routing) using the formula $$B_1\left[\frac{1}{V}\right] + B_2 A + B_3\left[\frac{1}{C}\right] + B_4 P + B_5 R,$$

where V is the expected volume of the transport computer, A is the measure of availability of the transport computer, C is the cost associated with the transport computer (e.g., a dollar amount or percentage that the transport computer charges the resource provider per request), P is a proximity score of the transport computer (e.g., the nearest node may have a proximity score of 1, and the farthest node may have a proximity score of 0, with intermediate values for nodes at intermediate distances), and R is a success/decline ratio of the transport computer. $B_1$, $B_2$, $B_3$, $B_4$, and $B_5$ are coefficients which can be adjusted to weight the factors in the decisioning logic as desired.

The gateway server 403 may further use hysteresis to avoid unnecessary switching between transport computers. The gateway server may establish one or more hysteresis thresholds. For example, a first hysteresis threshold may be used for switching from transport computer A to transport computer B, and a second hysteresis threshold may be used for switching from transport computer B to transport computer C. A hysteresis threshold may be used to dampen the effect of one or more of the factors used to make a routing decision. As an example, the selection algorithm may include the condition to only change from a primary transport computer if the secondary transport computer has been given a score which exceeds the score of the primary transport computer by an amount that exceeds the hysteresis threshold value. Using a hysteresis threshold is advantageous in that it can prevent switching back and forth between transport computers unnecessarily. Such perturbations can be particularly problematic when the routing algorithm is sensitive to small variations, e.g., in volume and/or response time.

At step 414, the gateway server 403 transmits the authorization request to the selected particular transport computer. Such communication can take place over a direct connection or via a network such as the Internet, and may adhere to any appropriate standards and use any appropriate transmission protocol or scheme.

In some embodiments, the gateway server 403 may determine to transmit an authorization request directly to a processing network for processing (e.g., if one or more transport computers are unavailable or experiencing delays). Further settlement messages may be transmitted to a transport computer when the transport computer becomes available. Backup routing to a processing network is described in detail in U.S. patent application Ser. No. 15/653,350, which is hereby incorporated by reference in its entirety.

IV. Determining Network Availability

Detecting availability generally involves a statistical analysis of messages sent between the gateway server and the transport computers.

One such method of detecting availability, recited below, involves the analysis of error codes received by the gateway server from transport computers. The gateway server may analyze error codes generated by transport computers based on various different schemes, in determining the network availability of a set of potential transport computers.

Another such method of detecting availability, recited below, involves the analysis of messages received by the gateway server from transport computers. Some messages, such as handshaking messages, may be used to establish a communication channel between two entities. If the gateway server sends a message to a transport computer and the transport computer does not respond with its own response message, communication would typically not proceed. Further, if the transport computer does not respond within a threshold time period, the gateway server may preferably route messages to another transport computer. Therefore, the gateway server may evaluate some combination of responses received within a period, and response times recorded within that period, in order to determine the quality of communication between the gateway server and the transport computer. If only a small fraction of messages are responded to in a timely fashion, and/or the response times are longer than average, this may indicate that the transport computer is not a desirable destination for authorization request messages.

Another such method of detecting availability may involve the statistical analysis of heartbeat messages. A heartbeat message can involve repeated transmission of messages indicating that an entity is available to communicate over a channel. A steady stream of heartbeat messages indicates a "healthy" connection, an unsteady heartbeat signal may indicate network issues (e.g., the transport computer may be experiencing delays or failure). By analyzing the amount of heartbeat messages received versus the expected number of heartbeats received over some predetermined time period, the availability of the transport computer may be determined.

A. Error Codes

The server computer may determine a measure of availability of a transport computer using error codes, according to some embodiments. The gateway server may initially send a request to a transport computer. The request may be an authorization request. Alternatively, or additionally, the request may be a handshake message, as described below with respect to FIG. 6. Accordingly, various types of messages, sent to a transport computer in an error state, may prompt receipt of an error code.

The gateway server may determine whether the transport computer returned an error code. The gateway server may, for example, store one or more tables defining error codes used by different transport computers. As an example, a first transport computer may potentially return error code 04, indicating the transport computer is unavailable, or error code 07, indicating failure for an unspecified reason. Another transport computer may use another error code scheme (e.g., 5677 indicates transport computer unavailability). The transport computer may look up received codes using such tables to determine whether an error code has been returned. If the transport computer returned an error code, then the gateway server may determine not to route an authorization request to this transport computer within a certain time period (e.g., within 1 minute or 4 hours). Alternatively, or additionally, the gateway server may factor the type of error code received into computing a health score for the transport computer.

B. Response Analysis

Figure 5:
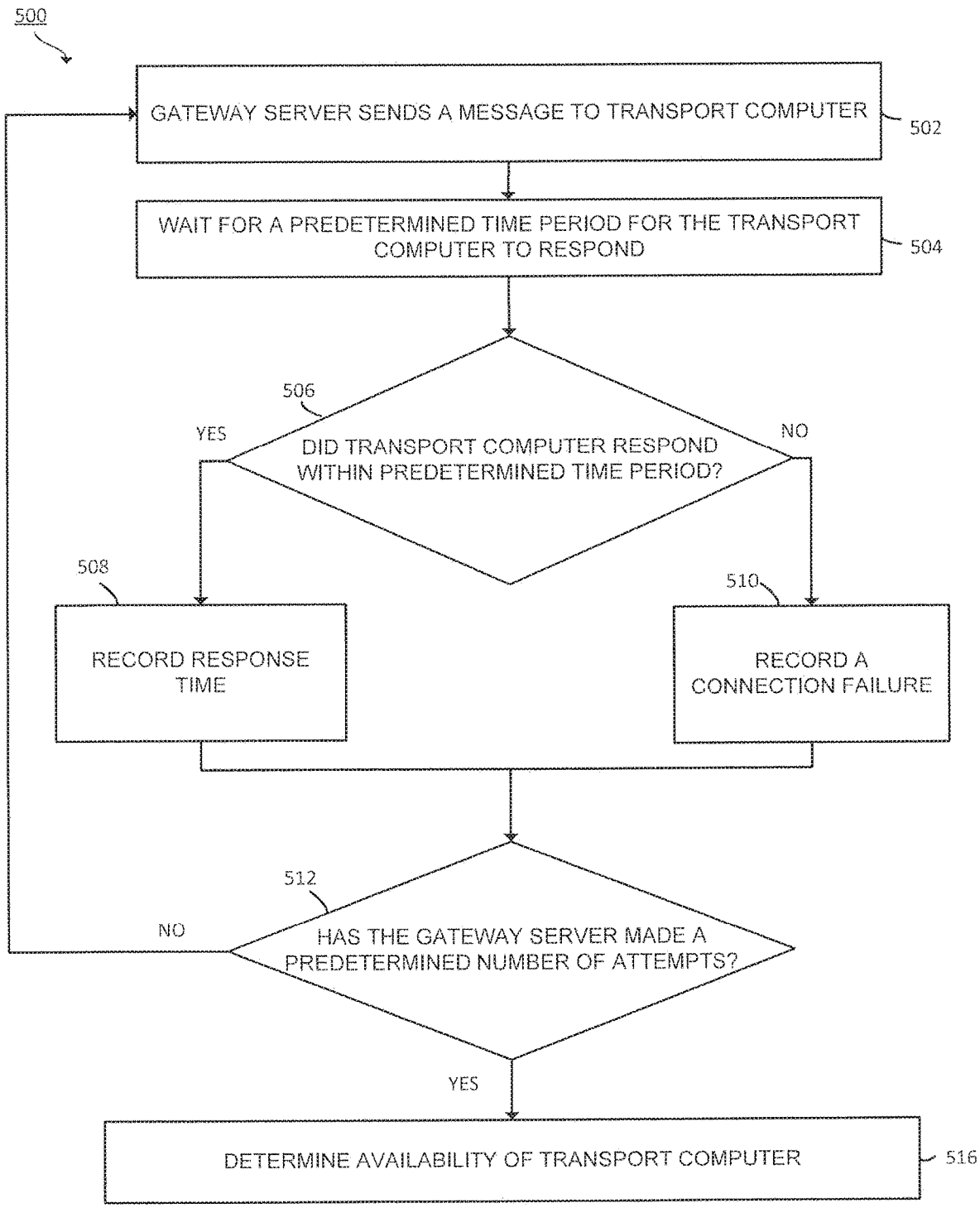
FIG. 5 is a flowchart showing a method of determining transport computer availability based on received responses to messages according to some embodiments.

FIG. 5 shows a method 500 for determining a measure of availability of a transport computer using analysis of responses received from the transport computer, according to some embodiments.

At step 502, a gateway server sends a message to a transport computer. The message may, for example, be an authorization request message or a handshake message. A handshake message could include any information required for the handshaking procedure. The handshaking procedure is used in many different transmission protocols, such as the "Transmission Control Protocol" or TCP, and is used to establish a stable communication channel before more substantive communications take place.

This handshaking process may involve first sending, by the gateway server, a first handshake message to the transport computer. The first handshake message may indicate to the transport computer that a gateway server wishes to establish a communication channel. The first handshake message may include information such as a network address at which the gateway server can be reached. It may also include an indicator or code that informs the transport computer of a communication or handshaking protocol. The handshaking message sent in step 502 may be analogous to the first handshake message described above. Additionally, the handshake message sent in step 502 may be a later message sent as part of the handshaking process. The handshaking message may be represented as a stream of octets, groups of eight bits. It may also be represented in a different data structure. The size and the amount of data in the handshaking message may depend on the nature of the handshaking procedure or the network.

At step 504, the gateway server waits a predetermined time period for the transport computer to respond to the message. The predetermined time period may be based on the volume of requests processed by the gateway server or by other factors or empirical observations. For example, if experimentation determines that a specified percentage (e.g., 99.99%) of responses occur within 30 milliseconds of sending the message, the predetermined time period may be 30 milliseconds.

At step 506, the gateway server determines whether the transport computer has responded to the authorization request or the handshake message within a predetermined time period. This determination may involve determining a response time. The response time may be measured, for example, based on the time elapsed between transmitting the message to the transport computer and receiving the response from the transport computer. The gateway server may determine such an elapsed time, and compare the elapsed time to a predetermined threshold value.

Alternatively, or additionally, this determination may involve evaluating whether the gateway server has received a valid response to a handshake message during the predetermined time period. For some communication protocols, the gateway server might expect a specifically formatted handshake message response. As an example, the gateway server may expect the first eight octets to correspond to a network address, the second 2 octets to correspond to a timestamp, and a final octet to correspond to an "operation code," which indicates the next step in the handshaking process. The gateway server may determine that the transport computer did not respond to the handshake message if the transport computer is unable to send a valid response.

When the message is an authorization request message, the response from the transport computer may be either an acknowledgement response or an authorization response. An acknowledgement response may be used in some network communication protocols in order to verify that a message has been received. The transport computer may be expected to provide an authorization response, either as a stream of octets or another data structure after receiving any substantial communication from the transport computer.

If the transport computer has responded to the message within the predetermined time period, then the flow proceeds to step 508. If the transport computer has not responded to the message within the predetermined time period, then the flow proceeds to step 510.

At step 508, when the gateway server determines that the transport computer has responded to the message, the gateway server records the response time. The gateway server may compute the response time, for example, by subtracting the time at which the message was sent from the time at which the response was received. The gateway server may store the response time in an array with other related data, such as an identifier of the transport computer, an identifier of the resource provider, a timestamp associated with the request, etc.

At 510, when the gateway server determines that the transport computer has not responded to the message, the gateway server records a connection failure. The recorded connection failure may indicate that a message was not responded to by the transport computer within the threshold time. This recorded connection failure could include information such as a timestamp, which indicates the time at which the connection failure occurred. The gateway server may record connection failures, as examples, by incrementing a counter, or by updating a stored array of failure data to indicate a timestamp corresponding to the time of failure.

At step 512, the gateway server determines whether it has made a predetermined number of attempts to reach the transport computer. The gateway server may, for example, increment an attempt counter as attempts are made. The attempt counter may serve as a record of the number of attempts made by the gateway server. The attempt counter may be a software counter, or it may be implemented as a specialized piece of hardware. In either case, the attempt counter can be incremented or read by the gateway server. Upon incrementing the counter, the gateway server may compare the counter value to some predetermined number of attempts. As examples, the predetermined number of attempts may be set to a value such as two, three, or ten, depending on the circumstances.

The advantage of repeatedly attempting to reach the transport computer is evident from a statistical perspective. If 90% of communications receive a response to message, one out of ten communications will fail. However, if the response probability is independent, the probability of four communications failing to receive a responses to message is only one out of 10,000, a much lower failure rate.

At step 512, when the gateway server has not made a predetermined number of attempts to reach the transport computer, the flow proceeds back to step 502, and the gateway server makes another attempt to reach the transport computer, repeatedly doing so until the gateway server has made a predetermined number of attempts.

At step 516, when the gateway server has made a predetermined number of attempts to reach the transport computer, the gateway server may determine the availability of the transport computer. Determining the availability of the transport computer may involve computing an availability score based on the recorded response times and connection failures. As an example, the gateway server may compute an availability score which is inversely proportional to the average response time and the number of connection failures recorded after the predetermined number of attempts. The response times and connection failures may be evaluated based on the predetermined number of attempts, and/or over a time period. The availability may further be determined based on additional factors, such as error codes, success/decline ratio, heartbeat messages, etc.

C. Heartbeat Message

Figure 6:
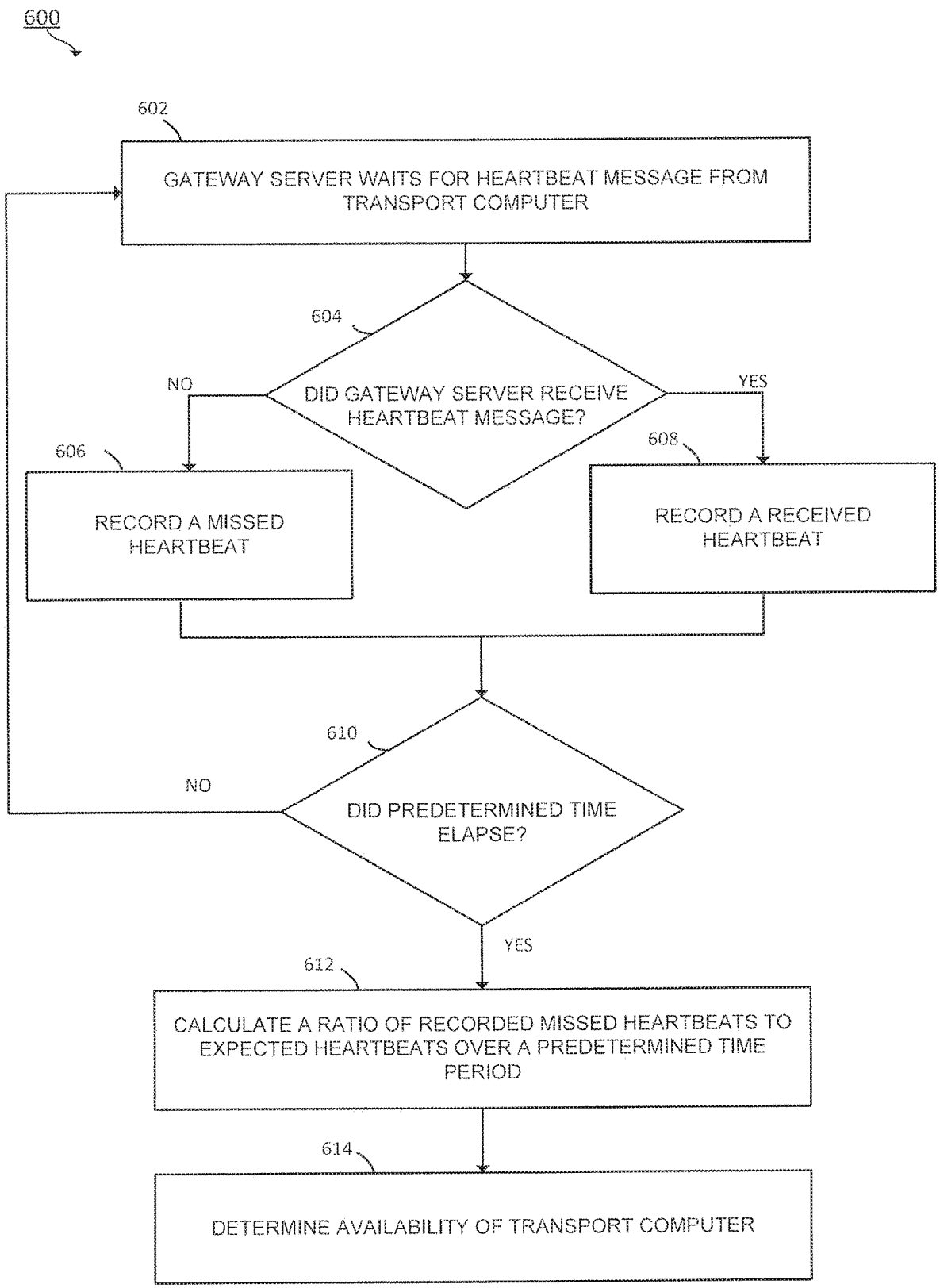
FIG. 6 is a flowchart showing a method of determining transport computer availability using heartbeat messages according to some embodiments.

FIG. 6 shows a method 600 of determining transport computer availability using heartbeat messages.

At step 602, the gateway server waits for a heartbeat message from the transport computer. A heartbeat message may be a message that is sent during the absence of other communications and indicates that the transport computer is "alive," in the sense that it is receptive to communication. The heartbeat message may be sent during a regular interval, or over an irregular, but known schedule. A heartbeat message may, for example be sent once per second in the absence of other communication.

At step 604, the gateway server evaluates whether it received a heartbeat message from the transport computer. If the gateway server received a heartbeat message, nothing out of the ordinary is occurring and the availability of the transport computer is expected to be unchanged. In this case, flow proceeds to step 608. If the gateway server did not receive a heartbeat message, then flow proceeds to step 606.

At step 606, the gateway server records a missed heartbeat. There are numerous ways in which the gateway server could record a missed heartbeat. For example, the gateway server could maintain a count of missed heartbeats, or a count of both missed heartbeats and received heartbeats using software or hardware. For example, the gateway server could maintain a variable stored in memory which is incremented as heartbeats are missed. As a second example, the gateway server could maintain a two row by N column array, where each column corresponds to a missed or received heartbeat and a timestamp.

At step 608, the gateway server records a received heartbeat. Recording a received heartbeat may be executed in a similar fashion to recording a missed heartbeat, as described above with respect to step 606.

At step 610, the gateway server determines whether a predetermined time has elapsed. The predetermined time may be some stored time interval for analyzing a set of heartbeat messages. For example, the predetermined time period could be five minutes long. In some cases it may be advantages to have a shorter time period, if for example the heartbeat rate is high, or a longer time period if the heartbeat rate is low. Accordingly, the gateway server may arrive at a stored number of recorded missed and received heartbeats, over the course of the predetermined time period. Upon determining that the predetermined time has elapsed, then the gateway server may proceed to step 610. If the gateway server determines that the predetermined time has not elapsed, then the gateway server may return to step 602 and continue to gather additional heartbeat data.

At step 612, the gateway server calculates a ratio of recorded missed heartbeats to expected heartbeats over the predetermined time period. Calculating the ratio may involve iterating through the data structure holding the heartbeat recordings and calculating the number of missed heartbeats versus the total number of heartbeats. It may also involve determining an elapsed time value (e.g., recorded by a software or hardware timer) and calculating an expected number of heartbeat messages as the product of the elapsed length of time and the known heartbeat message rate (e.g., a specified heartbeat message rate). The ratio can then be calculated by dividing the recorded number of missed heartbeats by the total number of heartbeats.

Alternatively, or additionally, the ratio of missed heartbeats may be calculated using a different grouping of heartbeats (e.g., without the use of a time interval). For example, the ratio may be calculated against the last 10000 heartbeats, rather than against the number of heartbeats in a predetermined timeframe.

At step 614, the gateway server determines the availability of the transport computer. The gateway server may determine the availability of the transport computer based on the ratio of missed heartbeats. The ratio of missed heartbeats may be compared to a predetermined level of missed heartbeats which is considered normal (e.g., less than 0.2 is considered an indicator or poor health). Alternatively, or additionally, the ratio of missed heartbeats may be used in conjunction with other factors in determining an overall health score for the transport computer (e.g., based on missed heartbeats, response times, and success/decline ratio).

V. Determining Expected Volume

Determining expected volume involves analysis of historical behaviors of transport computers. The historical behaviors may be selected based on temporal proximity and/or based on cyclical patterns.

One such method of determining expected volume, recited below, involves the analysis of historical parameters, in comparison with current parameters associated with a transport computer. The gateway server may store parameters associated with transport computers, along with volume data, as requests are processed. Analysis of such data may be used to create a predictive model for determining an expected volume, based on current conditions.

Another such method of determining expected volume, recited below, involves the analysis of recent volumes. The gateway server may store volume data associated with each of a plurality of transport computers. The gateway server may use the stored volume data to identify transport computers which have recently been experiencing relatively high volumes.

A. Historical Parameter Analysis

Figure 7:
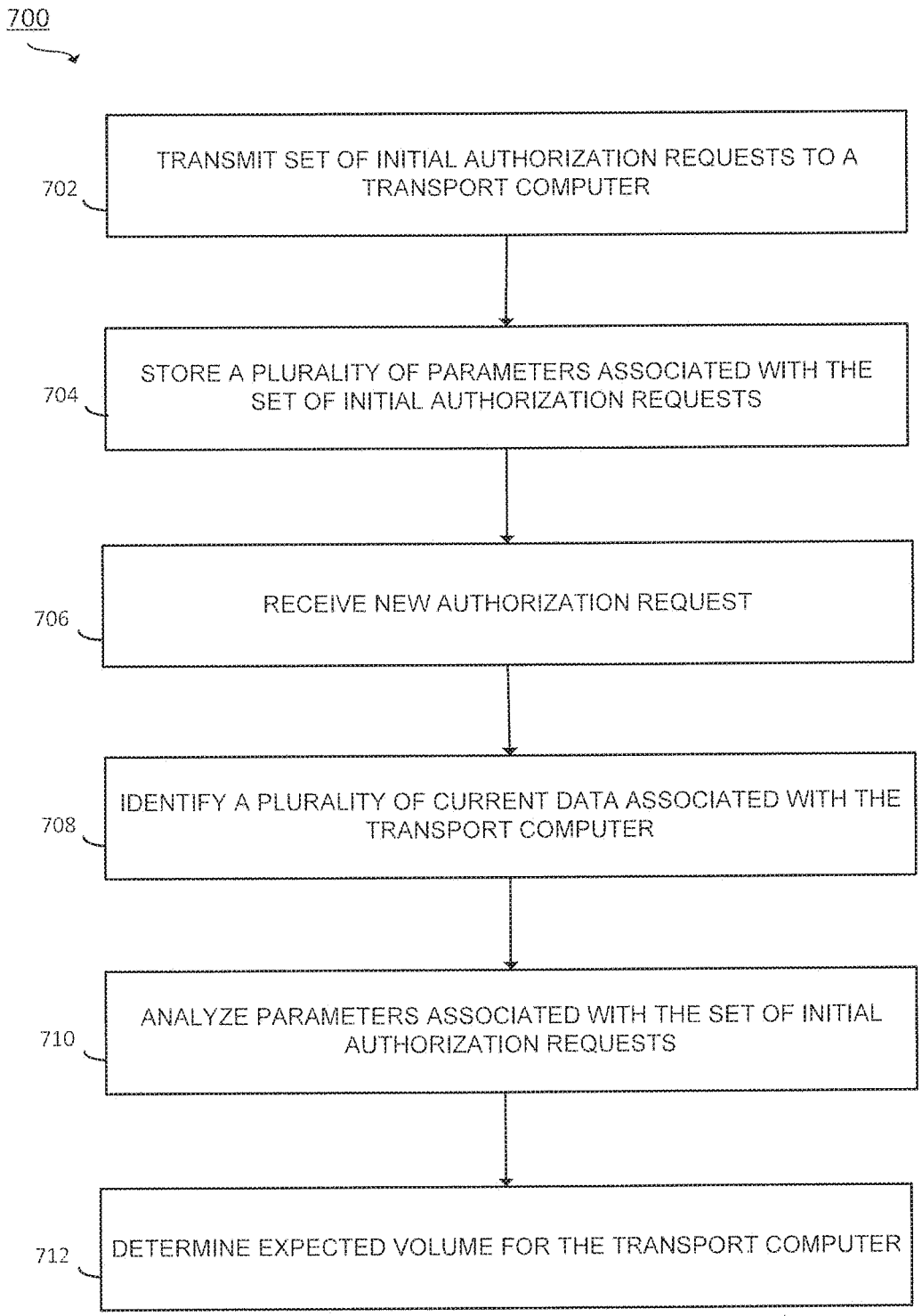
FIG. 7 is a flowchart showing a method of determining an expected volume for a transport computer according to some embodiments.

FIG. 7 shows a method 700 of determining transport computer recent volume using historical parameter analysis.

At step 702, the gateway server transmits a set of initial authorization requests to a transport computer. The gateway server may receive the set of initial authorization requests from various resource provider computers. The gateway server may forward the set of initial authorization requests to the transport computer. This may occur over a particular time period. For example, the gateway server may track initial authorization requests, to gather data for use in training a model, over the course of several months.

At step 704, the gateway server stores a plurality of parameters associated with the set of initial authorization requests. The gateway server may, for example, store the parameters to one or more arrays or objects in the routing database. The gateway server may parse each received message to extract parameters based on data fields of the authorization request. The parameters may include a time, a location, an amount, a communication channel, etc. The values corresponding to these parameters may be stored to the routing database in an indexed fashion (e.g., one column of an array may correspond to timestamps associated with each of a series of received authorization requests, anther column of the array may correspond to corresponding amounts, etc.).

At step 706, the gateway server receives a new authorization request. The gateway server may receive the new authorization request from a resource provider computer, as described above in Section III.

At step 708, the gateway server identifies a plurality of current data elements associated with the transport computer. The data elements may be associated with the transport computer in the sense that the data elements pertain to the transport computer. For example, the data elements may include one or more of a location of the transport computer, a timestamp recorded by the transport computer, a communication channel used by the transport computer, or an error state of the transport computer. The gateway server may parse the new authorization request and extract various data elements, substantially as described above with respect to gathering historical parameters at step 704.

At step 710, the gateway server analyzes the parameters associated with the set of initial authorization requests. The gateway server may analyze the initial authorization requests to identify parameters associated with high historical volumes. For example, particular dates, times of day, and/or locations may historically be associated with higher-than-average volumes for the transport computer. The gateway server may identify particular parameter values or combinations thereof which are associated with higher-than-average volumes. This may comprise determining an average volume using the gathered historical data.

At step 712, the gateway server determines an expected volume for the transport computer. The gateway server may determine the expected volume for the transport computer by comparing the current data to the analyzed parameters associated with the set of initial authorization requests. This may be done with rules determined based on the analysis at step 710. For example, based on the analysis of the parameters at step 710, the gateway server may have determined that high volume is expected for transport computers in India on Dhanteras, a popular shopping day in the country. If a current request data indicate that the request was received on Dhanteras, then the gateway server may predict high volume.

B. Recent Volume

The gateway server may determine an expected volume for the transport computer based on a recent volume of authorization requests. The gateway server may track messages routed to the transport computer over a period of time and/or a number of authorization requests. For example, the gateway server may increment a counter each time a message is routed to the transport computer over the course of an hour. As another example, the gateway server may store, to the routing database, data associated with each message to the transport computer. Such data may include a timestamp, the source of the message, a transaction channel, etc.

The gateway server may analyze the recent messages to determine an expected volume. The gateway server may use a counter value computed within the predetermined period, and use this as an indication of the current volume. The current volume may be used as a good metric of the volume in the near future. Alternatively, or additionally, the gateway server may compute a change in volume over a recent time period. For example, if the volume has been steadily rising for an hour, the volume may be expected to continue to rise on a similar trajectory.

VI. Success/Decline Analysis

Figure 8:
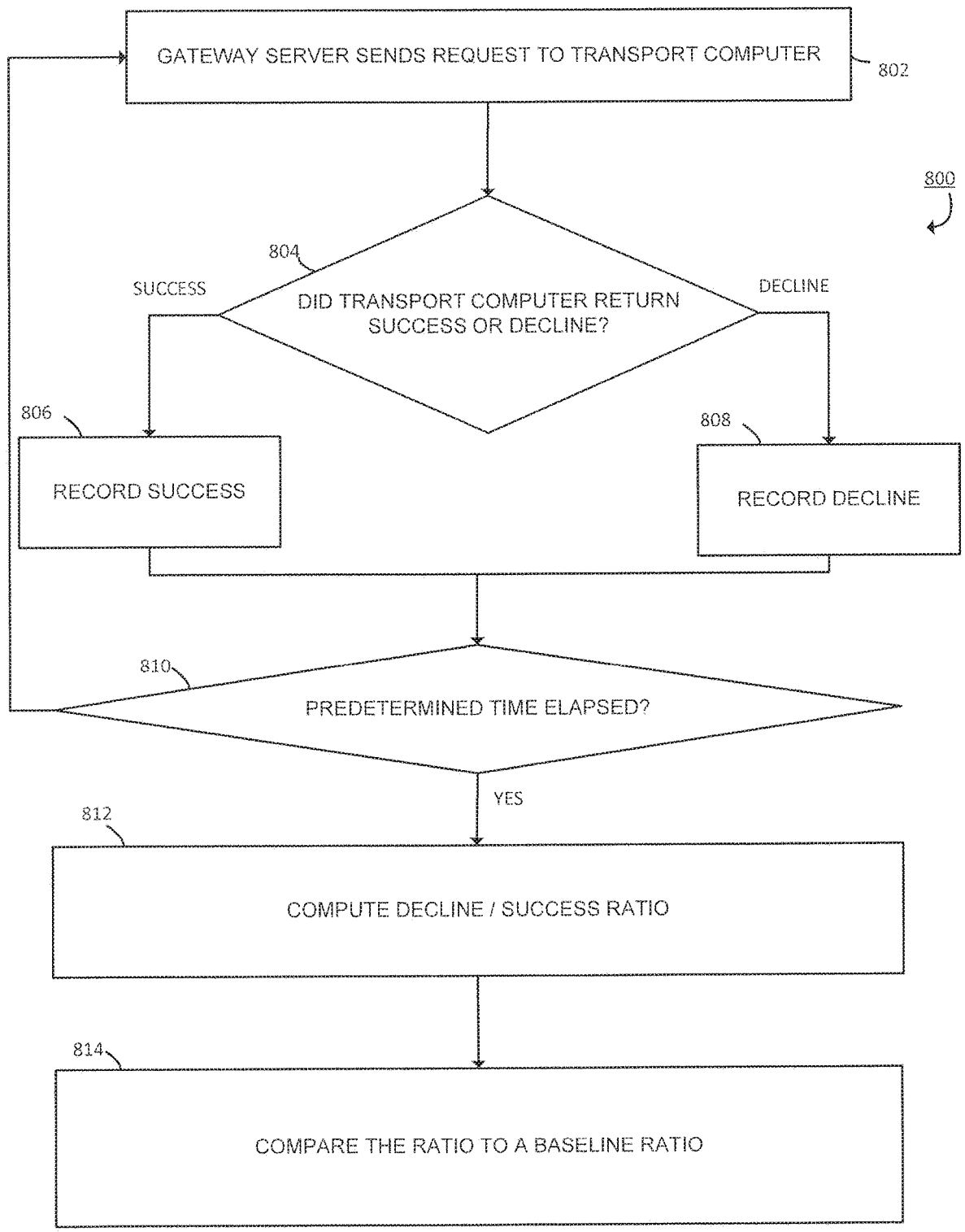
FIG. 8 is a flowchart showing a method of evaluating a ratio of declines to successes corresponding to a transport computer according to some embodiments.

FIG. 8 shows a method 800 for determining a measure of availability of a transport computer using success/decline analysis, according to some embodiments.

At step 802, a gateway server sends a request to the transport computer. The request may be an authorization request. Alternatively, or additionally, the request may be an authentication request.

Subsequently, the transport computer may receive the request. The transport computer may add data and/or codes to the request. The transport computer may transmit the request to a processing network and/or an authorizing computer.

The processing network and/or the authorizing computer may execute fraud analysis. In some cases, the processing network and/or the authorizing computer may determine that the request should be declined, in error, based on information received from the transport computer. For example, the transport computer may have added an incorrect code or piece of information to the request before transmitting it onward. Thus, some transport computers may cause the system to decline a disproportionate number of requests based on false positives. Accordingly, the ratio of declined requests to successful requests can be useful in evaluating transport computer health.

The processing network and/or the authorizing computer transmits a response, to the transport computer, either indicating a success (e.g., the request passed the fraud screening), or decline (e.g., the request did not pass the fraud screening). The transport computer receives the response, and transmits the response to the gateway server. The gateway server receives the response.

At step 804, the gateway server determines whether the transport computer returned a success or a decline. The gateway server may analyze the received message to make such a determination. For example, the gateway server may receive an authorization response message containing a numerical code which indicates whether the request has been approved or declined. The gateway server may identify the code within the message, and look up the meaning of the code using a stored mapping. These codes may vary across transport computers, processing networks, and/or authorizing computers. Accordingly, the gateway server may maintain a set of mappings specifying different approve/decline codes used by different entities.

If the gateway server determines that the transport computer returned success (e.g., the authorization request is approved), then the gateway server may proceed to step 806. If the gateway server determines that the transport computer returned decline (e.g., the authorization request is declined), then the gateway server may proceed to step 808.

At step 806, the gateway server records a success. As an example, the gateway server may maintain a variable stored in memory which is incremented as messages are received indicating success. As a second example, the gateway server could maintain a two-row by N-column array, where each column corresponds to a received message indicating success or decline, respectively.

At step 808, the gateway server records a decline. As an example, the gateway server may maintain a variable stored in memory which is incremented as messages are received indicating decline. As a second example, the gateway server may store successes and declines to an array, as described above with respect to step 806.

At step 810, the gateway server determines whether a predetermined time has elapsed. The gateway server may periodically assess a set of recorded successes and declines. This may correspond to a stored predetermined time interval. For example, every day or every two hours, the gateway server may determine that a predetermined time has elapsed. Accordingly, the gateway server may arrive at a stored number of recorded successes and failures, over the course of the predetermined time interval. Upon determining that the predetermined time has elapsed, then the gateway server may proceed to step 812. If the gateway server determines that the predetermined time has not elapsed, then the gateway server may return to step 802 and continue to gather additional success/decline data.

At step 812, the gateway server computes a decline/success ratio. The gateway server may identify the stored number of recorded successes. The gateway server may identify the stored number of recorded declines. The gateway server may compute the decline/success ratio, based on the recorded successes and declines.

Alternatively, or additionally, the decline/success ratio may be calculated using a different grouping of responses (e.g., without the use of a time interval). For example, the ratio may be calculated against the last 10000 responses, rather than against the number of responses in a predetermined timeframe.

At step 814, the gateway server compares the ratio to a baseline ratio. The gateway server may identify a stored baseline ratio. The baseline ratio may correspond to an average, or acceptable, ratio of successes to declines. For example, in a particular region and/or time of the year, 10% of requests are fraudulent. Thus, the gateway server may determine that transport computers processing requests in which 30% or greater are declined as fraudulent are likely doing so in error, and are less desirable destinations for routing messages, as compared to those transport computers that are processing requests in which closer to 10% are flagged as fraudulent.

VII. Example Interfaces

Figure 9B:
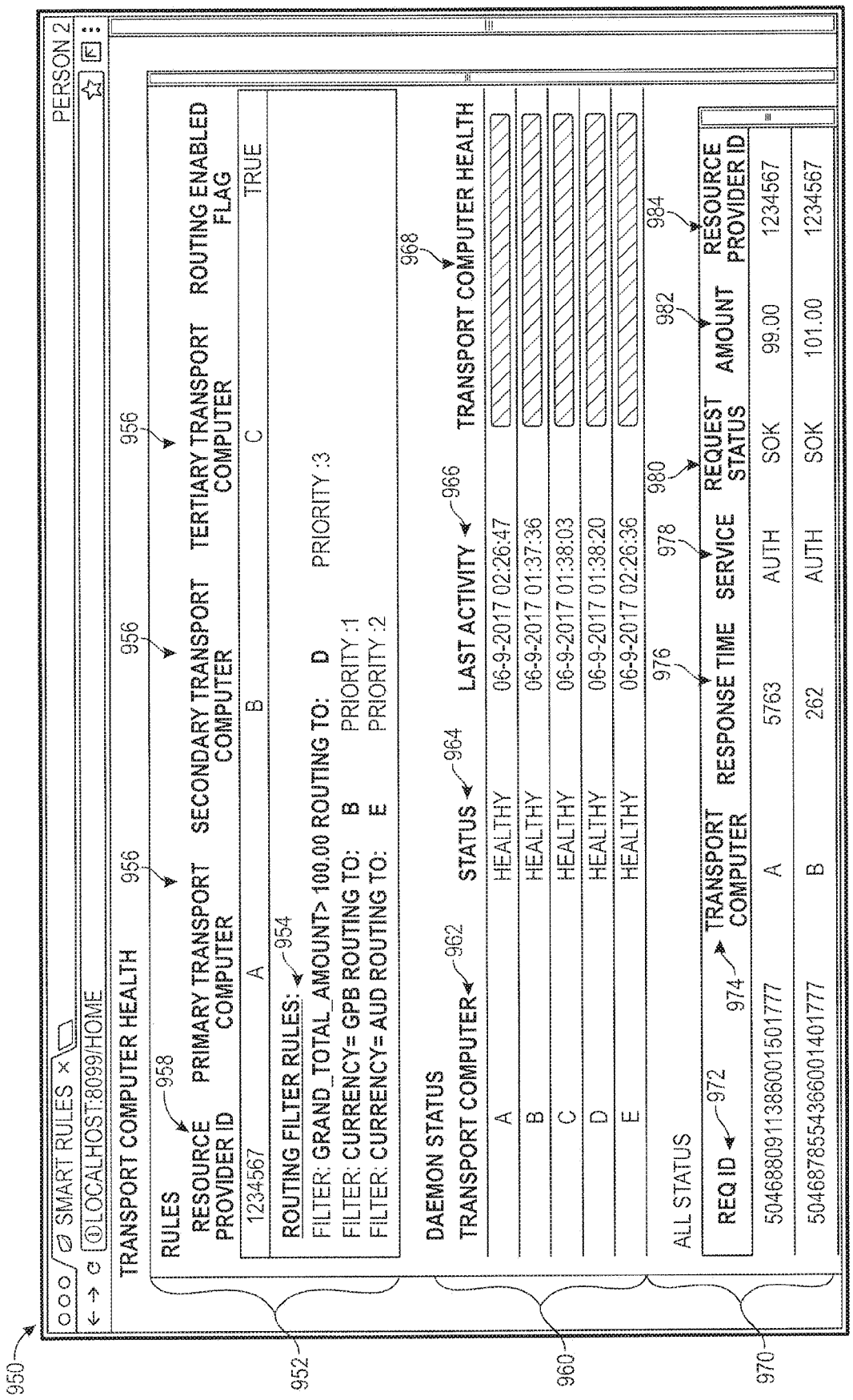
Figure 9C:
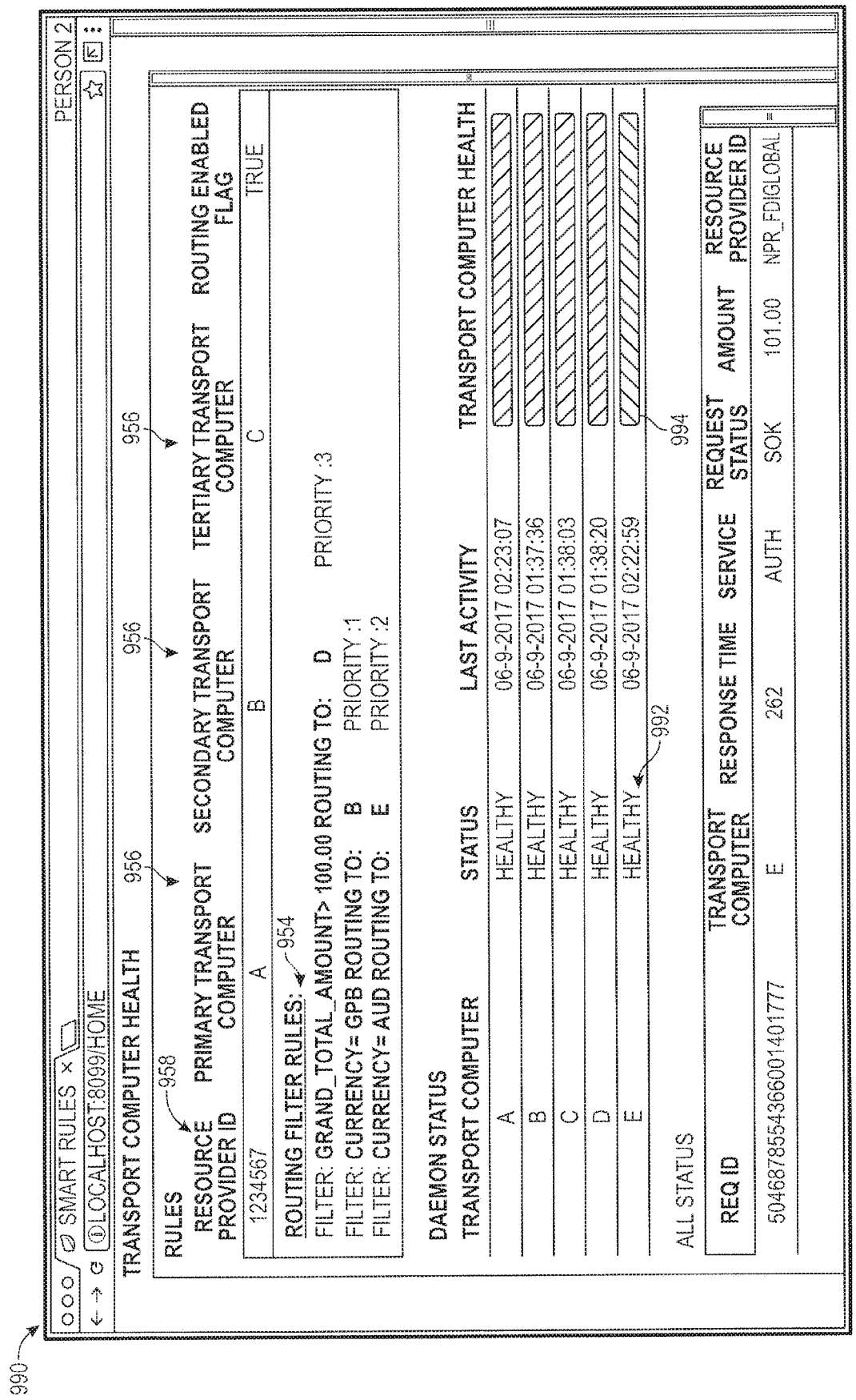

Example interfaces are illustrated in FIGS. 9A-9C. The interface of FIG. 9A may be used by an administrator (e.g., associated with the resource provider) to configure routing rules. The interfaces of FIGS. 9B and 9C may be used by an administrator to check transport computer health.

A. Rule Configuration

FIG. 9A shows an interface 900 for smart rule configuration, according to some embodiments. The smart rule configuration interface may include various elements enabling a user (e.g., an administrator associated with a resource provider) to configure routing preferences, to be used in the smart routing decisions described in detail above.

Interface 900 may include a field for a rule name 902. The field for the rule name 902 may enable a user to enter a name to distinguish various rules to be configured. The interface 900 may accept a rule name via text entry and/or a drop-down menu. As shown in FIG. 9A, the rule name is ROUTING_RULE_1.

Interface 900 may include a field for a resource provider ID 904. The field for the resource provider ID 904 may enable a user to enter or select data specifying a resource provider corresponding to the rule. The interface 900 may accept a resource provider ID via text entry and/or a drop-down menu. As shown in FIG. 9A, the rule name is 1234567.

Interface 900 may include fields specifying a set of transport computers (906, 908, 910). These fields may include a primary transport computer field 906 for specifying a primary transport computer. Such a primary transport computer may receive preference in routing selection. Secondary transport computer field 908 may be configured to accept input specifying a second-choice transport computer. Tertiary transport computer field 910 may be configured to accept input specifying a third-choice transport computer. The interface 900 may accept data specifying the set of transport computers using text entry and/or a drop-down menu. As shown in FIG. 9A, the primary transport computer is TC1, the secondary transport computer is TC2, and the tertiary transport computer is TC3. In some embodiments, the routing algorithm may generally send requests to the primary transport computer, and send requests to the secondary or tertiary transport computer if the primary transport computer is in poor health (e.g., experiencing failures and/or delays resulting in a low health score). Alternatively, or additionally, the ranking of the transport computers may be used as a factor in the routing algorithm (e.g., the primary transport computer is weighted more heavily than the secondary transport computer, which is in turn weighted more heavily than the tertiary transport computer).

Interface 900 may further include fields for configuring specific rules. Using the "field" entries 914, parameters may be selected. These parameters may correspond to information received in an authorization request message. As shown in FIG. 9A, the rules being configured relate to the "currency" field. This may correspond to a particular field of the authorization request message. For example, in ISO 8583 format, field 49 corresponds to a transaction currency code. Using the "field" entries 914, the user may specify data corresponding to such fields of the authorization request messages. Other examples include transaction time (field 12 in ISO 8583), transaction date (field 13 in ISO 8583), and transaction amount (field 4 in ISO 8583).

The "value" entries 916 may be configured to receive information corresponding to values corresponding to the "field" entries 914. As shown in FIG. 9A, the first rule specifies that the value for currency is USD, the second rule specifies that the value for currency is CAD, and the third rule specifies that the currency is GBP. As another example, if a field was transaction amount, the value could be a dollar amount for the transaction (e.g., $100).

The "priority" entries 918 may be configured to receive information specifying a priority of the rule. As shown in FIG. 918, the priority of the rules is 1, 2, 3, respectively. This may indicate that the rule with priority "1" should be weighted more heavily than the rule with priority "2," which in turn should be weighted more heavily than the rule with priority "3." In the example shown in FIG. 9A, the rules are mutually exclusive (e.g., the currency is either USD, CAD, or GBP). However, other rule sets may include two or more rules that could apply simultaneously. For example, rule 1 specifies currency=USD and rule 2 specifies greater than $1,000. In this case, the priority of the rules may come into play.

The "transport computer" entries 920 may be configured to receive information specifying a transport computer to select in connection with the rule. As shown in FIG. 918, the transport computers for the rules are TC1, TC1, and TC2, respectively. Accordingly, if the currency is USD according to the first rule, TC1 should be selected. If the currency is CAD according to the second rule, TC1 should also be selected. If the currency is GBP according to the third rule, TC2 should be selected.

The "condition" entries 922 may be configured to receive information specifying a condition. The condition may connect the field to the value. For example, as shown in FIG. 9A, each of the condition entries is "equals to." Accordingly, the rules specify "currency equals USD," "currency equals CAD," and "currency equals GBP." As another example, if the field were "transaction amount" and the value were "$100," then the condition could be "equals to," "greater than," "greater than or equal to," "less than," or "less than or equal to."

Interface 900 may further include a rule-submission element 924 for submitting the rules. This rule-submission element 924 may, for example, be a clickable button, as shown in FIG. 9A. Upon detecting user interaction with the rule-submission element 924, the interface may retrieve the user-selected data and generate and store the rules based on this user-selected data.

B. Transport Computer Status

FIGS. 9B and 9C show interfaces for displaying information about transport computer status. These interfaces may include various elements showing a user (e.g., an administrator associated with a resource provider) detailed information about transport computer health.

FIG. 9B shows an interface 950 for displaying information about transport computer status, wherein a set of transport computers have "healthy status." Interface 950 includes a rules section 952. The rules section 952 specifies a set of routing filter rules 954 and an ordered set of transport computers 956 for a particular resource provider defined by resource provider ID 958.

The ordered set of transport computers 956 indicates three transport computers which are to be used, in order of preference (primary transport computer A, secondary transport computer B, and tertiary transport computer C). The routing filter rules 954 specify conditions in which particular transport computers should be selected, including additional transport computers (D and E).

Interface 950 further includes a daemon status section 960. The daemon status section 960 shows a status 964 for each of the transport computers 962 indicated in the rules section 952. As shown in FIG. 9B, each of the transport computers has a "HEALTHY" status. This may indicate that these transport computers are not returning error codes, failing to respond, or experiencing significant delays or spikes in volume. The daemon status section 960 may further include color codes 968 indicating the health of the transport computer in a prominent, user-friendly manner. The daemon status section 960 may further include a time of last activity 966 for each of the transport computers 962.

Interface 950 further includes an "all status" section 970. The "all status" section 970 shows detailed information about particular requests processed by the transport computers. This detailed information may include request IDs 972 identifying the specific requests, the transport computers 974 which processed the corresponding requests, and the response time 976 for each transport computer (e.g., how long it took to receive back a response after sending a request to the respective transport computer). This detailed information may further include a service 978 corresponding to the request (e.g., authorization), a request status 980 (e.g., Successfully Accepted (SOK)), an amount 982 (e.g., $99 or $101), and a resource provider ID 984 corresponding to the resource provider that submitted the request. Although a particular resource provider may have configured the rules shown in interface 950, the "all status" section may show information retrieved based on transactions across multiple resource providers, leveraging the rich data available to the gateway computer.

FIG. 9C shows an interface 990 for displaying information about transport computer status, wherein a transport computer has an "unhealthy" status. The elements of interface 990 are generally similar to those described above with respect to the interface 950 of FIG. 9B. However, transport computer E has an "unhealthy" status 992, and is indicated with a different health color code 994. Since transport computer E is selected by one of the rules, this would show an administrator that the rule is likely being overridden due to poor transport computer health.

VIII. Computer System

Figure 10:
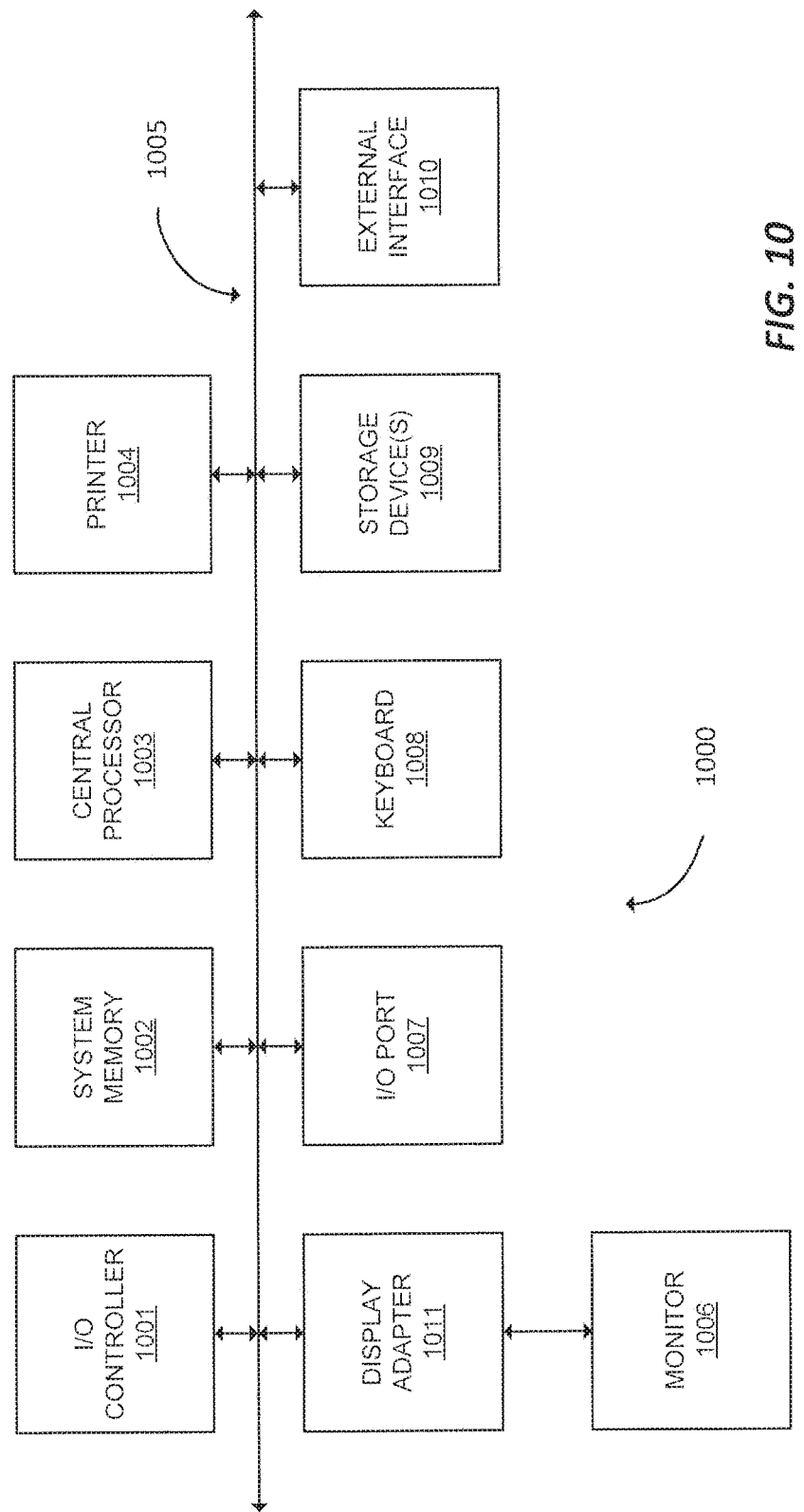
FIG. 10 is a block diagram showing a computer system according to some embodiments.

Any of the computer systems mentioned herein may utilize any suitable number of subsystems. Examples of such subsystems are shown in FIG. 10 in computer apparatus 1000. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 10 are interconnected via a system bus 1005. Additional subsystems such as a printer 1004, keyboard 1008, storage device(s) 1009, monitor 1006, which is coupled to display adapter 1011, and others are shown. Peripherals and input/output (I/O) devices which couple to I/O controller 1001, can be connected to the computer system by any number of means known in the art such as input/output (I/O) port 1007 (e.g., USB, FireWire®). For example, I/O port 1007 or external interface 1010 (e.g. Ethernet, Wi-Fi, etc.) can be used to connect computer system 1000 to a wide area network such as the Internet, a mouse input device, or a scanner. The interconnection via system bus 1005 allows the central processor 1003 to communicate with each subsystem and to control the execution of instructions from system memory 1002 or the storage device(s) 1009 (e.g., a fixed disk, such as a hard drive or optical disk), as well as the exchange of information between subsystems. The system memory 1002 and/or the storage device(s) 1009 may embody a computer readable medium. Any of the data mentioned herein can be output from one component to another component and can be output to the user.

A computer system can include a plurality of the same components or subsystems, e.g., connected together by external interface 1010 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a gateway server:
    receiving, from a resource provider computer, an authorization request for accessing a resource, the authorization request comprising a resource provider identifier corresponding to a resource provider;
    determining, based on the resource provider identifier, a set of transport computers;
    for each transport computer of the set of transport computers:
        retrieving, from the transport computer, status information of the transport computer;

determining a measure of network availability of the transport computer over a network based on the status information retrieved from the transport computer; and identifying an expected volume of authorization requests for the transport computer, wherein identifying the expected volume of authorization requests for each transport computer, of the set of transport computers, comprises computing a volume of authorization requests recently received by the transport computer;

retrieving, from a database, a stored plurality of rules for transport computer selection;

based at least upon the stored plurality of rules, the expected volume of authorization requests for each transport computer, of the set of transport computers, and the measure of network availability of each transport computer, of the set of transport computers:

selecting a particular transport computer for processing the authorization request; and transmitting, over the network, the authorization request to the particular transport computer, wherein the authorization request for accessing the resource is thereafter approved or declined.

2. The method of claim 1, wherein identifying the expected volume of authorization requests for the transport computer comprises:

retrieving a plurality of parameters associated with a set of authorization requests previously received by the transport computer;

identifying a corresponding plurality of current data elements associated with the transport computer; and comparing the corresponding plurality of current data elements associated with the transport computer to the plurality of parameters associated with the set of authorization requests previously received by the transport computer.

3. The method of claim 1, wherein the status information retrieved from the transport computer comprises one or more of: an error code, a response code, or a response time.

4. The method of claim 1, wherein:

retrieving the status information of the transport computer comprises:

transmitting one or more messages to the transport computer; and recording one or more respective response times or connection failures; and determining the measure of network availability of the transport computer comprises computing a score based on the one or more respective response times or connection failures.

5. The method of claim 1, wherein determining the measure of network availability of the transport computer comprises:

receiving a number of heartbeat messages from the transport computer over a time period; and determining the measure of network availability of the transport computer comprises comparing the number of heartbeat messages received over the time period to an expected number of heartbeat messages to be received over that time period, the expected number of heartbeat messages determined based on a specified heartbeat message rate and a length of the time period.

6. The method of claim 1, further comprising:

transmitting a plurality of requests to the transport computer;

receiving a respective plurality of responses from the transport computer, each response indicating either a success or a decline;

based on the respective plurality of responses, computing a ratio of declines to successes; and comparing the computed ratio to a baseline ratio, wherein the particular transport computer is selected based on the comparison.

7. The method of claim 1, further comprising:

computing a score based on the measure of network availability, the expected volume of authorization requests, and the stored plurality of rules; and using the score in selecting the particular transport computer.

8. The method of claim 1, further comprising, before retrieving the stored plurality of rules:

causing display of an interface for the resource provider to configure rules;

receiving, by the gateway server via the interface, input to configure a rule;

based on the input, generating the rule; and storing the rule, as part of the stored plurality of rules.

9. The method of claim 1, further comprising:

receiving a notification that the particular transport computer has failed to process the authorization request;

based at least upon the notification, the stored plurality of rules, the expected volume of authorization requests for each transport computer, of the set of transport computers, and the measure of network availability of each transport computer, of the set of transport computers:

selecting a different transport computer for processing the authorization request; and transmitting the authorization request to the different transport computer.

10. A gateway server comprising:

a processor; and a non-transitory computer-readable medium coupled to the processor, the non-transitory computer-readable medium comprising code executable by the processor to perform a method comprising:

receiving, from a resource provider computer, an authorization request for accessing a resource, the authorization request comprising a resource provider identifier corresponding to a resource provider;

determining, based on the resource provider identifier, a set of transport computers;

for each transport computer of the set of transport computers:

retrieving, from the transport computer, status information of the transport computer;

determining a measure of network availability of the transport computer over a network based on the status information retrieved from the transport computer; and identifying an expected volume of authorization requests for the transport computer, wherein identifying the expected volume of authorization requests for each transport computer, of the set of transport computers, comprises computing a volume of authorization requests recently received by the transport computer;

retrieving, from a database, a stored plurality of rules for transport computer selection;

based at least upon the stored plurality of rules, the expected volume of authorization requests for each transport computer, of the set of transport computers, and the measure of network availability of each transport computer, of the set of transport computers:
  selecting a particular transport computer for processing the authorization request; and
  transmitting, over the network, the authorization request to the particular transport computer, wherein the authorization request for accessing the resource is thereafter approved or declined.

11. The gateway server of claim 10, wherein identifying the expected volume of authorization requests for the transport computer comprises:
  retrieving a plurality of parameters associated with a set of authorization requests previously received by the transport computer;
  identifying a corresponding plurality of current data elements associated with the transport computer; and
  comparing the corresponding plurality of current data elements associated with the transport computer to the plurality of parameters associated with the set of authorization requests previously received by the transport computer.

12. The gateway server of claim 10, wherein the status information retrieved from the transport computer comprises one or more of: an error code, a number of heartbeat messages received from the transport computer over a time period, a response code, or a response time.

13. The gateway server of claim 10, wherein:
  retrieving the status information of the transport computer comprises:
    transmitting one or more messages to the transport computer; and
    recording one or more respective response times or connection failures over a time; and
  determining the measure of network availability of the transport computer comprises computing a score based on the one or more respective response times or connection failures.

14. The gateway server of claim 10, wherein:
  retrieving the status information of the transport computer comprises receiving a number of heartbeat messages from the transport computer over a time period; and
  determining the measure of network availability of the transport computer comprises comparing the number of heartbeat messages received over the time period to an expected number of heartbeat messages to be received over that time period, the expected number of heartbeat messages determined based on a specified heartbeat message rate and a length of the time period.

15. The gateway server of claim 10, further comprising:
  transmitting a plurality of requests to the transport computer;
  receiving a respective plurality of responses from the transport computer, each response indicating either a success or a decline;
  based on the respective plurality of responses, computing a ratio of declines to successes; and
  comparing the computed ratio to a baseline ratio,
  wherein the particular transport computer is selected based on the comparison.

16. The gateway server of claim 10, further comprising:
  computing a score based on the measure of network availability, the expected volume of authorization requests, and the stored plurality of rules; and
  using the score in selecting the particular transport computer.

17. The gateway server of claim 10, the method further comprising, before retrieving the stored plurality of rules:
  causing display of an interface for the resource provider to configure rules;
  receiving, by the gateway server via the interface, input to configure a rule;
  based on the input, generating the rule; and
  storing the rule, as part of the stored plurality of rules.

18. The gateway server of claim 10, the method further comprising:
  receiving a notification that the particular transport computer has failed to process the authorization request;
  based at least upon the notification, the stored plurality of rules, the expected volume of authorization requests for each transport computer, of the set of transport computers, and the measure of network availability of each transport computer, of the set of transport computers:
    selecting a different transport computer for processing the authorization request; and
    transmitting the authorization request to the different transport computer.

* * * * *